United States Patent
Nozawa

(10) Patent No.: US 10,473,912 B2
(45) Date of Patent: Nov. 12, 2019

(54) OPTICAL MODULE AND ELECTRONIC APPARATUS HAVING WAVELENGTH VARIABLE INTERFERENCE FILTER WITH VOLTAGE CONTROLLER

(71) Applicant: Seiko Epson Corporation, Tokyo (JP)

(72) Inventor: Takeshi Nozawa, Fujimi (JP)

(73) Assignee: Seiko Epson Corporation (JP)

( * ) Notice: Subject to any disclaimer, the term of this patent is extended or adjusted under 35 U.S.C. 154(b) by 21 days.

(21) Appl. No.: 15/815,832

(22) Filed: Nov. 17, 2017

(65) Prior Publication Data
US 2018/0149857 A1    May 31, 2018

(30) Foreign Application Priority Data

Nov. 28, 2016   (JP) .................. 2016-230286

(51) Int. Cl.
| | | |
|---|---|---|
| B41J 2/01 | (2006.01) | |
| G01J 3/02 | (2006.01) | |
| G02B 26/00 | (2006.01) | |
| H04N 1/00 | (2006.01) | |
| H02N 1/00 | (2006.01) | |
| G01J 3/10 | (2006.01) | |

(Continued)

(52) U.S. Cl.
CPC ............. *G02B 26/001* (2013.01); *B41J 2/01* (2013.01); *G01J 3/027* (2013.01); *G01J 3/0208* (2013.01); *G01J 3/0229* (2013.01); *G01J 3/0291* (2013.01); *G01J 3/10* (2013.01); *G01J 3/26* (2013.01); *G01J 3/50* (2013.01); *H02N 1/006* (2013.01)

(58) Field of Classification Search
CPC ..... B41J 2/01; B41J 2/0452; B41J 2/35; B41J 2/3558; B41J 2/40; G01B 11/14; G01B 2290/25; G01J 3/0208; G01J 3/0237; G01J 3/0229; G01J 3/0264; G01J 3/027; G01J 3/0291; G01J 3/10; G01J 3/26; G01J 2003/262–267; G01J 2003/2879; G01J 3/50; G01J 2009/0257; G01L 9/0079; G02B 5/284; G02B 5/288; G02B 6/29358–29367; G02B 6/29395; G02B 26/001; G02F 2001/213; G02F 1/216; H02N 1/006
USPC ....... 356/450, 451, 454, 477, 480, 496, 505, 356/506, 519, 626; 359/577–579
See application file for complete search history.

(56) References Cited

U.S. PATENT DOCUMENTS

| | | |
|---|---|---|
| 9,389,350 B2 | 7/2016 | Hirokubo |
| 2013/0308134 A1 | 11/2013 | Hirokubo |

(Continued)

FOREIGN PATENT DOCUMENTS

JP    2013-238755 A    11/2013

*Primary Examiner* — Stephone B Allen
*Assistant Examiner* — Ryan S Dunning
(74) *Attorney, Agent, or Firm* — Harness, Dickey & Pierce, P.L.C.

(57) ABSTRACT

An optical module includes: a wavelength variable interference filter that includes two reflection films facing each other via an inter-reflection-film gap and an electrostatic actuator changing a gap amount of the inter-reflection-film gap; and a voltage controller that is driven in accordance with a plurality of supply voltages from a power supplier and applies a driving voltage to the electrostatic actuator. The voltage controller reduces the driving voltage when one of the plurality of supply voltages is less than a predetermined threshold.

12 Claims, 24 Drawing Sheets

(51) Int. Cl.
  *G01J 3/26*  (2006.01)
  *G01J 3/50*  (2006.01)

(56) References Cited

U.S. PATENT DOCUMENTS

2014/0285100 A1* 9/2014 Akahoshi .............. H02M 7/217
                                                315/200 R
2016/0039200 A1* 2/2016 Shibata ................ B41J 2/04541
                                                347/19

* cited by examiner

| No. | NORMAL TIME | | | | TIME OF VOLTAGE ERROR DETECTION | | | |
|---|---|---|---|---|---|---|---|---|
| | i | Ra | Rb | Rc | i | Ra | Rb | Rc |
| 1 | 1 | 32k | 100k | 95k | 1 | 32k | 100k | 95k |
| 2 | 2 | 29k | 90k | 90k | 2 | 29k | 90k | 90k |
| 3 | 3 | 28k | 85k | 85k | 3 | 28k | 85k | 85k |
| 4 | 4 | 27k | 75k | 84k | 4 | 27k | 75k | 84k |
| 5 | 5 | 26k | 70k | 82k | 5 | 26k | 70k | 82k |
| 6 | 6 | 25k | 65k | 80k | 6 | 25k | 65k | 80k |
| 7 | 7 | 24k | 55k | 78k | 7 | 24k | 55k | 78k |
| 8 | 8 | 23k | 50k | 75k | 8 | 23k | 50k | 75k |
| 9 | 9 | 22k | 40k | 73k | 9 | 22k | 40k | 73k |
| 10 | 10 | 21k | 35k | 70k | 10 | 21k | 35k | 70k |
| 11 | 11 | 20k | 28k | 68k | 11 | 20k | 28k | 68k |
| 12 | 12 | 19k | 15k | 64k | 12 | 19k | 15k | 64k |
| 13 | 13 | 18k | 10k | 63k | 13 | 18k | 10k | 63k |
| 14 | 14 | 17k | 8k | 62k | 1 | 32k | 100k | 95k |
| 15 | 15 | 16k | 4k | 60k | | | | |
| 16 | 16 | 15k | 1k | 59k | | | | |

FIG.10

| No. | NORMAL TIME | | | | TIME OF VOLTAGE ERROR DETECTION | | | |
|---|---|---|---|---|---|---|---|---|
| | i | Ra | Rb | Rc | i | Ra | Rb | Rc |
| 1 | 1 | 32k | 100k | 95k | 1 | 32k | 100k | 95k |
| 2 | 2 | 29k | 90k | 90k | 2 | 29k | 90k | 90k |
| 3 | 3 | 28k | 85k | 85k | 3 | 28k | 85k | 85k |
| 4 | 4 | 27k | 75k | 84k | 4 | 27k | 75k | 84k |
| 5 | 5 | 26k | 70k | 82k | 5 | 26k | 70k | 82k |
| 6 | 6 | 25k | 65k | 80k | 6 | 25k | 65k | 80k |
| 7 | 7 | 24k | 55k | 78k | 7 | 24k | 55k | 78k |
| 8 | 8 | 23k | 50k | 75k | 8 | 23k | 50k | 75k |
| 9 | 9 | 22k | 40k | 73k | 9 | 22k | 40k | 73k |
| 10 | 10 | 21k | 35k | 70k | 10 | 21k | 35k | 70k |
| 11 | 11 | 20k | 28k | 68k | 11 | 20k | 28k | 68k |
| 12 | 12 | 19k | 15k | 64k | 12 | 19k | 15k | 64k |
| 13 | 13 | 18k | 10k | 63k | 13 | 18k | 10k | 63k |
| 14 | 14 | 17k | 8k | 62k | 3 | 28k | 85k | 85k |
| 15 | 15 | 16k | 4k | 60k | 2 | 29k | 90k | 90k |
| 16 | 16 | 15k | 1k | 59k | 1 | 32k | 100k | 95k |

FIG.17

OPTICAL MODULE AND ELECTRONIC APPARATUS HAVING WAVELENGTH VARIABLE INTERFERENCE FILTER WITH VOLTAGE CONTROLLER

BACKGROUND

1. Technical Field

The present invention relates to an optical module and an electronic apparatus.

2. Related Art

In the related art, there is known an optical module that includes a wavelength variable interference filter including a pair of facing reflection films and an electrostatic actuator unit changing the dimensions of a gap (a gap amount) between the reflection films and a voltage controller controlling an application voltage of the electrostatic actuator (for example, see JP-A-2013-238755).

As disclosed in JP-A-2013-238755, the wavelength variable interference filter includes first and second electrostatic actuators as the electrostatic actuator unit. The voltage controller includes a bias driver that applies a bias voltage to the first electrostatic actuator, a gap detector that detects a gap amount, a feedback controller that applies a feedback voltage to the second electrostatic actuator, and a microcomputer that controls the bias driver and the feedback controller. The bias driver, the feedback controller, and the microcomputer are each driven by being supplied with power from an external apparatus or the like.

The voltage controller can adjust the gap amount with high precision so that a transmission wavelength of the wavelength variable interference filter becomes an aim wavelength (target wavelength). For example, the bias driver applies a bias voltage according to the target wavelength to the first electrostatic actuator based on an instruction from the microcomputer. The feedback controller applies a feedback voltage according to the target wavelength to the second electrostatic actuator based on an instruction from the microcomputer and a detection value of the gap detector.

In the configuration of the related art, however, there is a concern of the voltage controller causing an erroneous operation when a power supply voltage to the bias driver, the feedback controller, and the microcomputer is reduced. For example, when the power supply voltage to the microcomputer is steeply reduced or power supply is abruptly stopped, there is a concern of a large voltage being output from the bias driver or the feedback controller due to an erroneous operation of the voltage controller.

SUMMARY

An advantage of some aspects of the invention is that it provides an optical module and an electronic apparatus capable of suppressing an influence of an erroneous operation when a power supply voltage is reduced.

An optical module according to an application example of the invention includes: a wavelength variable interference filter that includes two reflection films facing each other via an inter-reflection-film gap and an electrostatic actuator changing a gap amount of the inter-reflection-film gap; and a voltage controller that is driven in accordance with a plurality of supply voltages from a power supplier and applies a driving voltage to the electrostatic actuator. The voltage controller reduces the driving voltage when one of the plurality of supply voltages is less than a predetermined threshold.

Here, the predetermined threshold is, for example, a voltage value equal to or greater than a lower limit of a supply voltage range in which the voltage controller normally operates.

As described above, when the supply voltage is reduced and less than a lower limit of the supply voltage range, there is a concern of the voltage controller erroneously operating. In contrast, in the application example, the voltage controller reduces the driving voltage of the electrostatic actuator when one of the plurality of supply voltages is less than the predetermined threshold, that is, a voltage error occurs.

In this configuration, the driving voltage can be reduced before an erroneous operation of the voltage controller occurs, and thus it is possible to suppress an influence when the voltage controller causes an erroneous operation.

For example, in the related art, when the supply voltage to the voltage controller is reduced, the voltage controller causes an erroneous operation and the driving voltage of the electrostatic actuator is increased in some cases. In this case, the application voltage to the electrostatic actuator is increased and the reflection films come into contact with each other (pull-in), and thus there is a concern of the wavelength variable interference filter deteriorating. Since the feedback control does not appropriately function, there is a concern of oscillation occurring and pull-in further occurring.

In contrast, in the application example, at a time point at which the supply voltage to the voltage controller is reduced, the driving voltage to the electrostatic actuator is reduced. Therefore, it is possible to suppress the foregoing inconvenience, and thus it is possible to suppress the deterioration in the wavelength variable interference filter.

For example, before the driving voltage is further reduced and less than the lower limit, it is possible to also stop the driving of the wavelength variable interference filter normally by setting the driving voltage as 0 V under the appropriate control by the voltage controller.

In the optical module according to the application example, it is preferable that the voltage controller changes the driving voltage to a value equal to or less than a predetermined value when one of the plurality of supply voltages is less than the predetermined threshold.

Here, the predetermined value is, for example, an upper limit of a driving voltage range in which pull-in does not occur even when an erroneous operation of the voltage controller occurs and the driving voltage is varied. As the predetermined value, 0 V or a value near 0 V can be exemplified.

In the application example with this configuration, the driving voltage is changed to a value equal to or less than the predetermined value when a voltage error occurs. Thus, for example, even when the supply voltage is reduced after occurrence of the voltage error and the voltage controller erroneously operates, the pull-in of the wavelength variable interference filter does not occur and it is possible to more reliably suppress the deterioration in the wavelength variable interference filter.

In the optical module according to the application example, it is preferable that the voltage controller tapers the driving voltage.

In the application example with this configuration, when a voltage error occurs, the driving voltage is tapered to the predetermined value or less. Therefore, it is possible to suppress control failure of the gap amount due to abrupt change in the driving voltage. That is, it is possible to reduce the driving voltage to the predetermined value or less under the appropriate control by the voltage controller.

In the optical module according to the application example, it is preferable that the voltage controller tapers the driving voltage when one of the plurality of supply voltages is less than a predetermined first threshold, and changes the driving voltage to a value equal to or less than a predetermined value when one of the plurality of supply voltages is less than a second threshold less than the first threshold.

Here, the first and second thresholds are, for example, voltage values greater than the lower limit of the supply voltage range in which the voltage controller normally operates as in the predetermined threshold.

In the application example with this configuration, when one of the plurality of supply voltages is less than the predetermined first threshold, that is, a voltage error occurs, the driving voltage can be reduced under the appropriate control by the voltage controller, as described above, by tapering the driving voltage of the electrostatic actuator.

When the supply voltage is further reduced and less than the second threshold after the occurrence of the voltage error, the driving voltage is changed to the predetermined value or less. Thus, as described above, before an erroneous operation of the voltage controller occurs, it is possible to reduce the driving voltage to the predetermined value or less, and thus it is possible to suppress an influence of the erroneous operation.

In the optical module according to the application example, it is preferable that the wavelength variable interference filter includes first and second electrostatic actuators as the electrostatic actuator, the voltage controller includes a gap detector that detects the gap amount, a first driver that applies a first driving voltage as the driving voltage to the first electrostatic actuator, and a second driver that performs feedback control so that a detection value of the gap amount approaches a target value of the gap amount and applies a second driving voltage as the driving voltage to the second electrostatic actuator, and the voltage controller reduces the first driving voltage after reducing the second driving voltage when one of the plurality of supply voltages is less than the predetermined threshold.

Here, when the feedback control is performed to change the second driving voltage while changing the first driving voltage, the change amount of the gap amount increases. Thus, there is a concern of a time in which the gap amount becomes the target value (stabilization time) being enlarged or oscillation occurring.

In contrast, in the application example with the configuration described above, when a voltage error occurs, the voltage controller causes the second driver performing the feedback control of the second electrostatic actuator to reduce the second driving voltage and subsequently causes the first driver to reduce the first driving voltage. Thus, compared to when the first driving voltage is reduced and the second driving voltage is reduced, it is possible to perform the feedback control more appropriately and quickly, and thus it is possible to reduce the second driving voltage more quickly.

It is possible to reduce the second driving voltage after the voltage error occurs and before the erroneous operation of the voltage controller occurs, that is, under appropriate feedback control of the second driver.

In the optical module according to the application example, it is preferable that the second driver is able to change a driving parameter in the feedback control and changes the driving parameter when the second driving voltage is reduced.

In the application example with this configuration, the second driver changes the driving parameter when the second driving voltage is reduced. In this configuration, it is possible to perform the feedback control using the more appropriate driving parameter when the second driving voltage is reduced.

In the optical module according to the application example, it is preferable that the voltage controller includes a voltage monitor that outputs a detection signal indicating that one of the plurality of supply voltages is less than a predetermined threshold, the second driver includes an output unit that outputs the second driving voltage and a switch circuit that is installed on an output side of the output unit and switches a connection state in which the output unit and the second electrostatic actuator are connected and a non-connection state in which the output unit and the second electrostatic actuator are disconnected, and the switch circuit switches from the connection state to the non-connection state when the detection signal is input.

In the application example with this configuration, the switch circuit switches the connection between the output unit and the second electrostatic actuator from the connection state to the non-connection state based on the detection signal from the voltage monitor. In this configuration, when a voltage error occurs, the connection of the output unit and the second electrostatic actuator is considered to be the non-connection state. Therefore, even when a high voltage is output from the output unit due to an erroneous operation, the high voltage is not applied to the second electrostatic actuator and it is possible to suppress the deterioration in the wavelength variable interference filter more reliably. By installing the switch circuit, it is not necessary for the voltage controller to reduce the second driving voltage and it is possible to suppress an increase in a processing load of the voltage reduction.

In the optical module according to the application example, it is preferable that the voltage controller includes a driver that applies the driving voltage to the electrostatic actuator and a driving controller that controls the driver, and the driving controller controls the driver to reduce the driving voltage when one of the plurality of supply voltages is less than the predetermined threshold.

In the application example with this configuration, it is possible to reduce the driving voltage under the control of the driving controller. For example, depending on an occurrence situation of the voltage error, the value of the driving voltage, the reduction timing of the driving voltage, the reduction method, or the like can be appropriately selected. It is possible to more appropriately stop the wavelength variable interference filter.

An electronic apparatus according to an application example of the invention includes: an optical module that includes a wavelength variable interference filter that includes two reflection films facing each other via an inter-reflection-film gap and an electrostatic actuator changing a gap amount of the inter-reflection-film gap, and a voltage controller that is driven in accordance with a plurality of supply voltages from a power supplier and applies a driving voltage to the electrostatic actuator; and a module controller that controls the optical module. The voltage controller reduces the driving voltage when one of the plurality of supply voltages is less than a predetermined threshold.

In this application example, as in the application example according to the optical module, at a time point at which the supply voltage to the voltage controller is reduced, the driving voltage to the electrostatic actuator is reduced. Therefore, it is possible to suppress the foregoing inconvenience such as the pull-in or oscillation, and thus it is possible to suppress the deterioration in the wavelength variable interference filter.

For example, before the driving voltage is further reduced and less than the lower limit, it is possible to also stop the driving of the wavelength variable interference filter normally by setting the driving voltage as 0 V under the appropriate control by the voltage controller.

BRIEF DESCRIPTION OF THE DRAWINGS

The invention will be described with reference to the accompanying drawings, wherein like numbers reference like elements.

FIG. 10 is a diagram illustrating examples of feedback parameters according to the first embodiment.

FIG. 17 is a diagram illustrating examples of feedback parameters according to the second embodiment.

DESCRIPTION OF EXEMPLARY EMBODIMENTS

First Embodiment

Hereinafter, a first embodiment of the invention will be described with reference to the drawings. In the first embodiment, a printer 10 (ink jet printer) will be described as an example of an electronic apparatus and an optical module according to the invention.

Schematic Configuration of Printer

Figure 1:
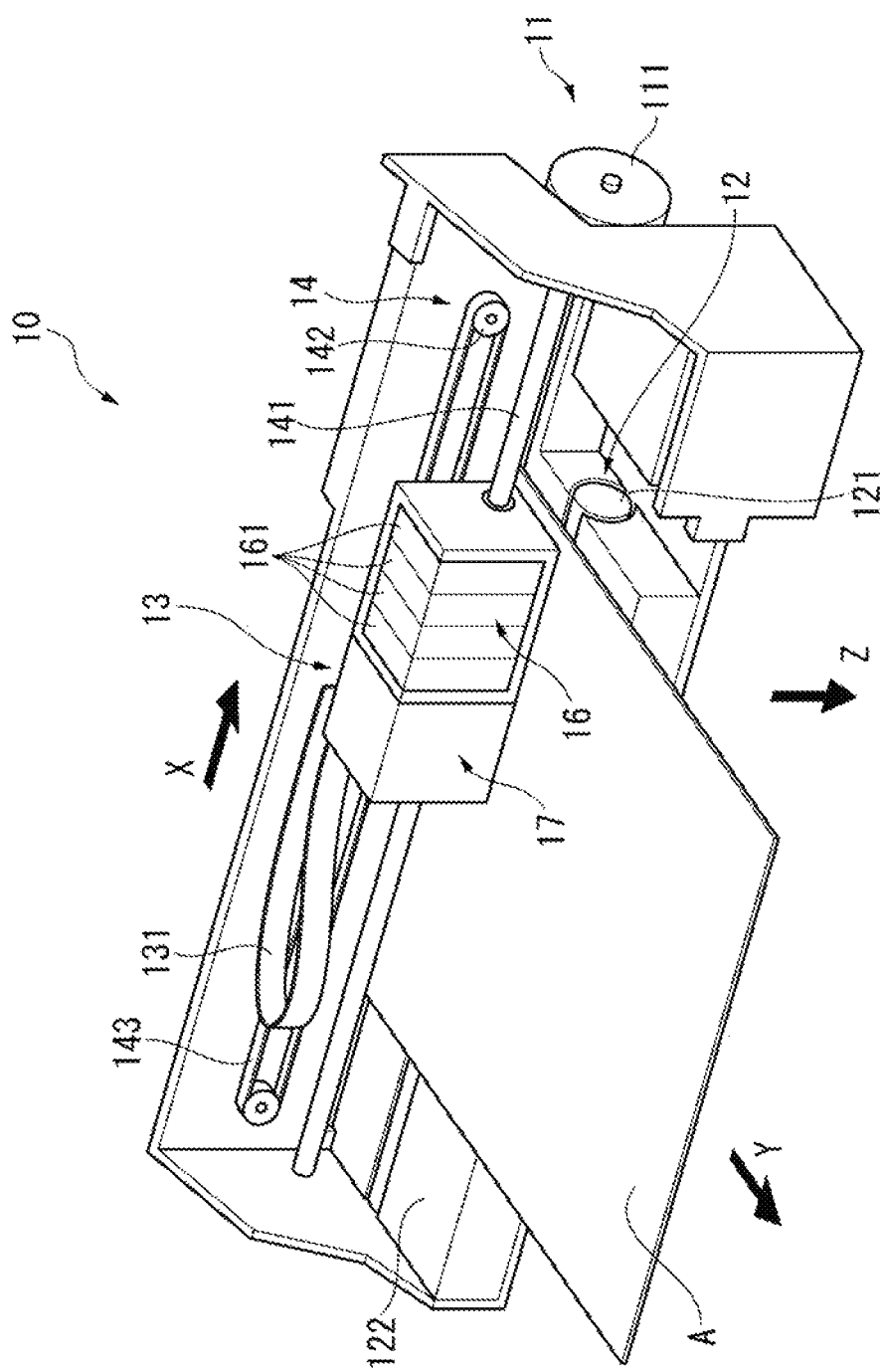
FIG. 1 is an exterior view illustrating a schematic configuration of a printer according to a first embodiment of the invention.
Figure 2:
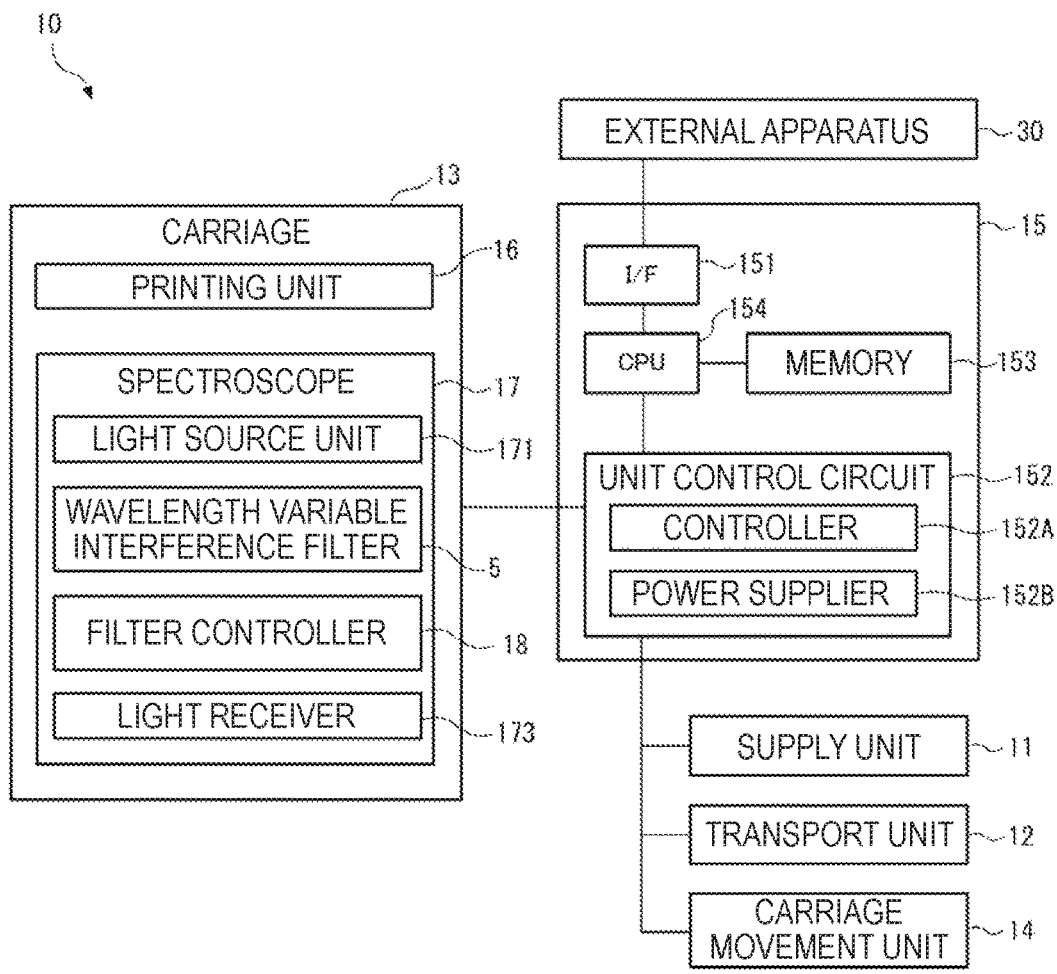
FIG. 2 is a block diagram illustrating the schematic configuration of the printer according to the first embodiment.

FIG. 1 is a diagram illustrating an example of an exterior configuration of a printer 10 according to the first embodiment. FIG. 2 is a block diagram illustrating a schematic configuration of the printer 10 according to the embodiment.

As illustrated in FIG. 1, the printer 10 includes a supply unit 11, a transport unit 12, a carriage 13, a carriage movement unit 14, and a controller 15 (see FIG. 2). The printer 10 controls the units 11, 12, and 14 and the carriage 13, for example, based on print data input from an external apparatus 30 such as a personal computer such that an image is printed on a medium A. The printer 10 according to the embodiment performs spectrometry on the image printed on the medium A and performs a process based on a measurement result (for example, performs color calibration process based on the measurement result of the spectrometry of a color patch for color calibration).

Hereinafter, each configuration of the printer 10 will be described specifically.

The supply unit 11 is a unit that supplies the medium A (in the embodiment, a white paper sheet is exemplified) which is an image formation target to an image formation position. The supply unit 11 includes, for example, a roll body 111 (see FIG. 1) around which the medium A is wound, and a roll driving motor (not illustrated), and a roll driving wheel line (not illustrated). Then, based on an instruction from the controller 15, the roll driving motor is rotationally driven and a rotation force of the roll driving motor is delivered to the roll body 111 via the roll driving wheel line. Thus, the roll body 111 is rotated and the paper sheet wound around the roll body 111 is supplied downstream (+Y direction) in the Y direction (a sub-scanning direction).

In the embodiment, the example in which the paper sheet wound around the roll body 111 is supplied has been described, but the invention is not limited thereto. The medium A may be supplied in accordance with any supply method, for example, in such a manner that the medium A such as a paper sheet stacked in a tray or the like is supplied one by one by a roller or the like.

The transport unit 12 transports the medium A supplied from the supply unit 11 in the Y direction. The transport unit 12 is configured to include a transport roller 121, a following roller (not illustrated) that disposed between the transport roller 121 and the medium A and follows the transport roller 121, and a platen 122.

When a driving force is delivered from the transport motor (not illustrated) and the transport motor is driven under the control of the controller 15, the transport roller 121 is rotationally driven in accordance with the rotation force and transports the medium A in the Y direction in a state in which the medium A is pinched between the transport roller 121 and the following roller. The platen 122 facing the carriage 13 is installed downstream (+Y side) in the Y direction of the transport roller 121.

The carriage 13 includes a printing unit 16 that prints an image on the medium A and a spectroscope 17 that performs spectrometry of a predetermined measurement region R (see FIG. 3) above the medium A.

The printing unit 16 is, for example, a so-called ink jet head that ejects ink from nozzles formed on the lower surface side (a surface facing the medium A) and forms an image. The printing unit 16 includes, for example, ink cartridges 161 corresponding to ink of a plurality of colors, pressure chambers which are formed in the nozzles and to which the ink is supplied from the ink cartridges 161 of the corresponding colors, and piezoelectric elements installed in the pressure chambers. Ink dots are formed on the medium A with ink droplets ejected from the nozzles by driving of the piezoelectric elements.

As will be described below in detail, the spectroscope 17 is configured to include a wavelength variable interference filter 5 that transmits light with a wavelength according to a gap amount between a pair of reflection films and a filter controller 18 that controls a gap amount of the wavelength variable interference filter 5. The spectroscope 17 is equivalent to an optical module.

The carriage 13 is installed to be movable in a main scanning direction (which is one direction in the invention and the X direction) intersecting the Y direction by the carriage movement unit 14.

The carriage 13 is connected to the controller 15 by a flexible circuit 131 and performs a printing process (an image forming process on the medium A) by the printing unit 16 and a spectrometry process by the spectroscope 17 based on an instruction from the controller 15.

The carriage movement unit 14 is configured with a movement mechanism in the invention and reciprocates the carriage 13 in the X direction based on an instruction from the controller 15.

The carriage movement unit 14 is configured to include, for example, a carriage guide shaft 141, a carriage motor 142, and a timing belt 143.

The carriage guide shaft 141 is disposed in the X direction and both ends of the carriage guide shaft 141 are fixed to, for example, a casing of the printer 10. The carriage motor 142 drives the timing belt 143. The timing belt 143 is held in substantially parallel to the carriage guide shaft 141 and a part of the carriage 13 is fixed to the timing belt 143. When the carriage motor 142 is driven based on an instruction from the controller 15, the timing belt 143 travels forward and backward and the carriage 13 fixed to the timing belt 143 is then guided to the carriage guide shaft 141 to reciprocate.

The controller 15 is equivalent to a module controller and is configured to include an I/F 151, a unit control circuit 152, a memory 153, and a central processing unit (CPU) 154, as illustrated in FIG. 2.

The I/F 151 inputs print data input from the external apparatus 30 to the CPU 154.

The unit control circuit 152 includes a controller 152A and a power supplier 152B.

The controller 152A controls each of the units 11 to 14 (including the filter controller 18) based on instruction signals from the CPU 154.

The power supplier 152B supplies power to the units 11 to 14 (including the filter controller 18).

The memory 153 stores various programs and various kinds of data for controlling the printer 10. As the various kinds of data, for example, print profile data for storing an ejection amount of each ink in regard to color data included as print data can be exemplified. A light emission property of each wavelength of a light source unit 171 or a light reception property (light reception sensitivity property) of each wavelength of a light receiver 173 may be stored.

The CPU 154 performs driving control of the supply unit 11, the transport unit 12, and the carriage movement unit 14, printing control of the printing unit 16, spectrometry control of the spectroscope 17, and a process (a color calibration process or the like) based on measurement data by the spectroscope 17 by reading various programs stored in the memory 153 and executing the programs.

Configuration of Spectroscope

Figure 3:
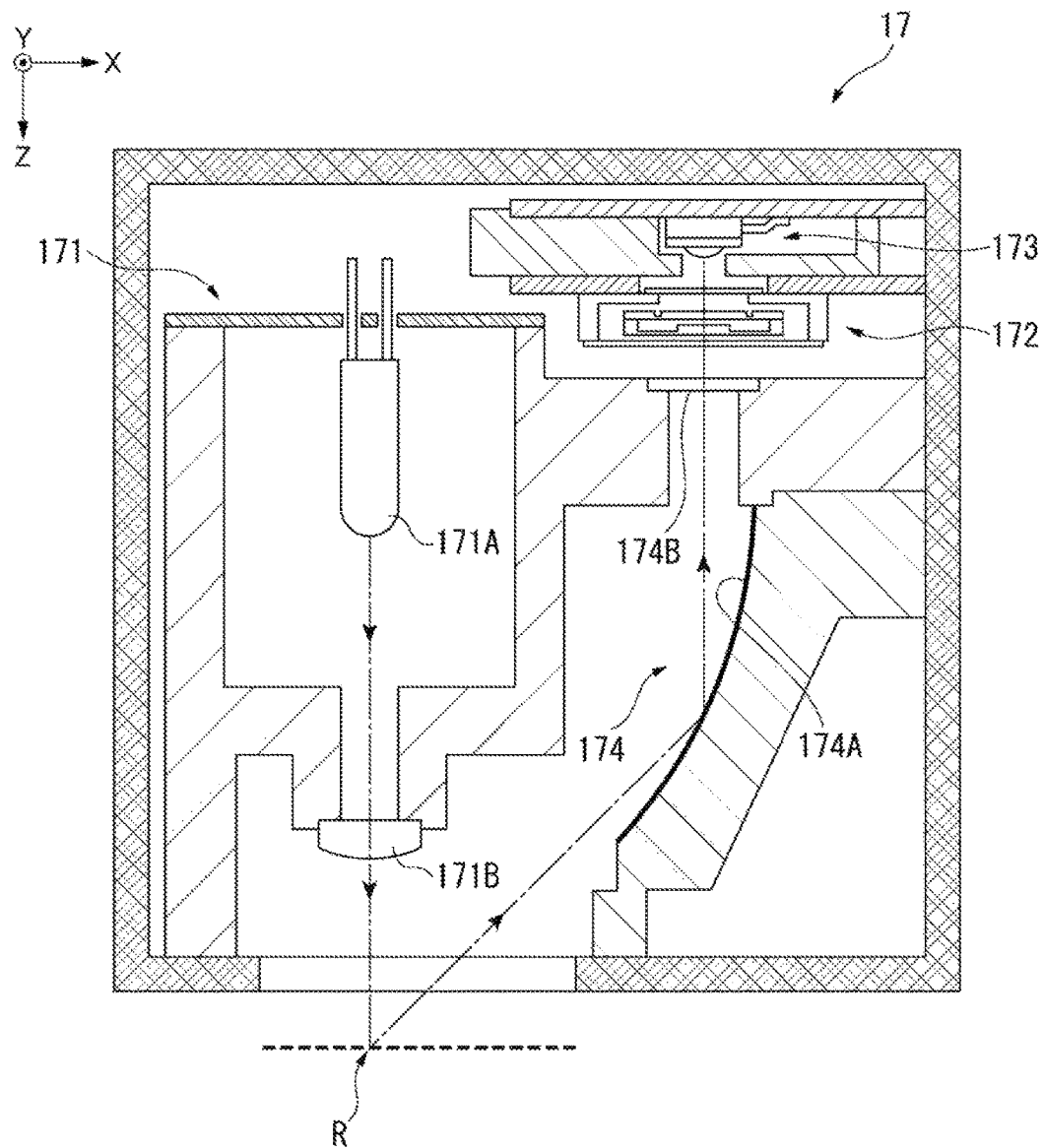
FIG. 3 is a sectional view illustrating a schematic configuration of a spectroscope according to the first embodiment.

FIG. 3 is a sectional view illustrating a schematic configuration of the spectroscope 17.

As illustrated in FIG. 3, the spectroscope 17 includes the light source unit 171, an optical filter device 172 including a wavelength variable interference filter 5, the light receiver 173, a light guide 174, and a filter controller 18 (see FIG. 2).

The spectroscope 17 radiates illumination light from the light source unit 171 to the medium A and causes light components reflected from the medium A to be incident on the optical filter device 172 by the light guide 174. Then, the optical filter device 172 emits (transmits) light with a predetermined wavelength from the reflected light and causes the light receiver 173 to receive the light. The optical filter device 172 can select a transmission wavelength (emission wavelength) under the control of the controller 15 and can perform spectrometry measurement of the measurement region R above the medium A by measuring an amount of light of each wavelength in the visible light.

Configurations of Light Source Unit, Light Receiver, and Light Guiding Optical System The light source unit 171 includes a light source 171A and a light collector 171B. The light source unit 171 radiates light emitted from the light source 171A in a normal direction to the surface of the medium A in the measurement region R of the medium A.

As the light source 171A, a light source capable of emitting light of each wavelength in the visible light band is preferably used. As the light source 171A, for example, a halogen lamp, a xenon lamp, or a white LED can be exemplified. In particular, a white LED which can be easily installed in a space restricted in the carriage 13 is preferably used. The light collector 171B is configured with, for example, a condensing lens and condenses the light from the light source 171A on the measurement region R. In FIG. 3, only one lens (condensing lens) is displayed as the light collector 171B, but a plurality of lenses may be configured to be combined.

The light receiver 173 is disposed on an optical axis of the wavelength variable interference filter 5 and receives the light transmitted through the wavelength variable interference filter 5. Then, the light receiver 173 outputs a detection signal (a current value) according to the amount of received light under the control of the controller 15. The detection signal output by the light receiver 173 is input to the controller 15 via an I-V converter (not illustrated), an amplifier (not illustrated), and an AD converter (not illustrated).

The light guide 174 includes a reflection mirror 174A and a bandpass filter 174B. The light guide 174 causes light reflected at 45° with respect to the surface of the medium A in the measurement region R to be reflected by the reflection mirror 174A on the optical axis of the wavelength variable interference filter 5. The bandpass filter 174B transmits light with the visible light band (for example, 380 nm to 720 nm) and cuts ultraviolet light and infrared light. Thus, the light with the visible light band is incident on the wavelength variable interference filter 5 and light with a wavelength selected by the wavelength variable interference filter 5 in the visible light band is received by the light receiver 173.

Configuration of Optical Filter Device

Figure 4:
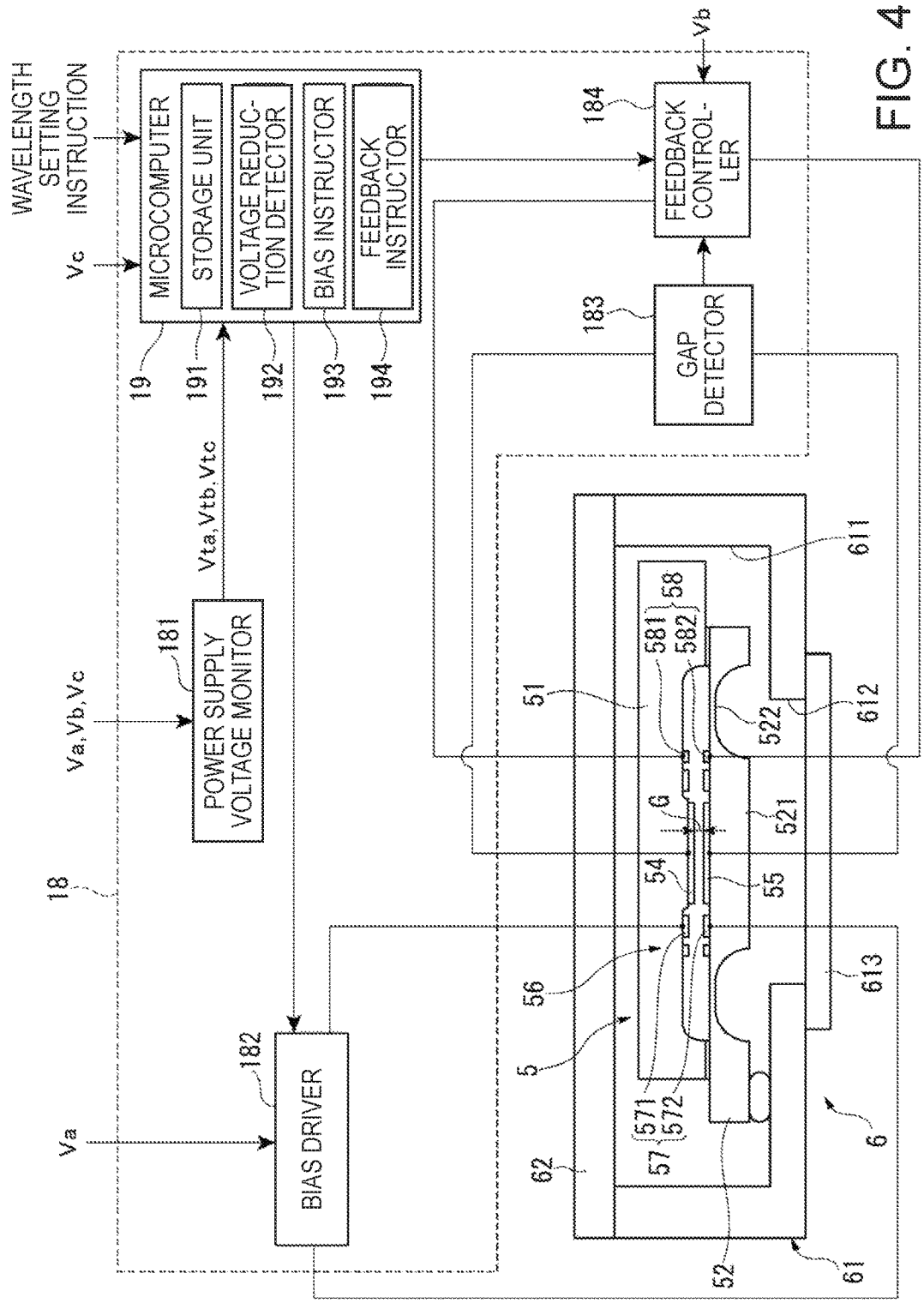
FIG. 4 is a diagram illustrating a schematic configuration of a filter controller according to the first embodiment.

FIG. 4 is a diagram schematically illustrating the wavelength variable interference filter 5 and the filter controller 18 included in the spectroscope 17.

As illustrated in FIG. 4, the optical filter device 172 includes a casing 6 and the wavelength variable interference filter 5 accommodated inside the casing 6.

Configuration of Wavelength Variable Interference Filter

The wavelength variable interference filter 5 is a wavelength variable type Fabry-Perot etalon element and includes a transmissive fixed substrate 51 and a transmissive movable substrate 52, as illustrated in FIG. 4. The fixed substrate 51 and the movable substrate 52 are bonded by a bonding film to be integrated each other.

The wavelength variable interference filter 5 includes a fixed reflection film 54 and a movable reflection film 55 disposed to face each other via a gap G (an inter-reflection-film gap) and an electrostatic actuator 56 that adjusts the dimensions of the gap G (a gap amount). The electrostatic actuator 56 includes a bias electrostatic actuator 57 (hereinafter referred to as a bias actuator 57) and a control electrostatic actuator 58 (hereinafter referred to as a control actuator 58) which can be independently driven. The bias actuator 57 is equivalent to a first electrostatic actuator and the control actuator 58 is equivalent to a second electrostatic actuator.

Configuration of Fixed Substrate

On the fixed substrate 51, the fixed reflection film 54 facing the movable substrate 52, a bias fixed electrode 571 that forms the bias actuator 57, and a control fixed electrode 581 that forms the control actuator 58 are installed. The fixed substrate 51 is formed to have a larger thickness dimension than the movable substrate 52, and thus there is no curvature of the fixed substrate 51 caused due to an electrostatic attraction at the time of applying a voltage to the electrostatic actuator 56 or an internal stress of the fixed electrodes 571 and 581 to be described below.

The fixed reflection film 54 is installed at a middle position of a groove formed in the fixed substrate 51. For example, a conductive alloy film such as a metal film of Ag or the like and an Ag alloy can be used as the fixed reflection film 54. For example, a dielectric multilayer film in which a high-refraction layer is $TiO_2$ and a low-refraction layer is $SiO_2$ may be used. In this case, the fixed reflection film 54 can be caused to function as an electrode by forming conductive metal alloy films on the lowermost layer and the surface layer of the dielectric multilayer film.

A fixed mirror electrode (not illustrated) is connected to the fixed reflection film 54. The fixed mirror electrode is connected to a gap detector 183 to be described below in the filter controller 18.

The bias fixed electrode 571 is formed in a substantial arc shape surrounding the fixed reflection film 54. The bias fixed electrode 571 is connected to a bias driver 182 to be described below in the filter controller 18.

The control fixed electrode 581 is formed in a substantial arc shape outside of the bias fixed electrode 571. The control fixed electrode 581 is connected to a feedback controller 184 to be described below in the filter controller 18.

In the embodiment, the example in which the bias fixed electrode 571, the control fixed electrode 581, and the fixed mirror electrode are independently disposed has been described, but the invention is not limited thereto. For example, the bias fixed electrode 571, the control fixed electrode 581, and the fixed mirror electrode may be connected to each other as a common electrode. In this case, in the filter controller 18, the common electrode is connected to the ground and the same potential is set.

Configuration of Movable Substrate

The movable substrate 52 includes a movable portion 521 and a holding portion 522 that is formed outside of the movable portion 521 and holds the movable portion 521.

The movable portion 521 is formed with a larger thickness dimension than the holding portion 522. In the movable portion 521, the movable reflection film 55, a bias movable electrode 572 that forms the bias actuator 57, and a control movable electrode 582 that forms the control actuator 58 are installed.

The movable reflection film 55 is installed in a middle portion of a surface of the movable portion 521 facing the fixed substrate 51 and faces the fixed reflection film 54 via the gap G. A reflection film that has the same configuration as the above-described fixed reflection film 54 is used as the movable reflection film 55.

A fixed mirror electrode (not illustrated) is connected to the movable reflection film 55. The movable mirror electrode is connected to the gap detector 183 to be described below in the filter controller 18.

The bias movable electrode 572 faces the bias fixed electrode 571 via a predetermined gap. The bias movable electrode 572 is connected to the bias driver 182.

The control movable electrode 582 faces the control fixed electrode 581 via a predetermined gap. The control movable electrode 582 is connected to the feedback controller 184.

The holding portion 522 is a diaphragm surrounding the movable portion 521 and is formed to have a smaller thickness dimension than the movable portion 521. The holding portion 522 is more easily bent than the movable portion 521 and the movable portion 521 can be displaced to the side of the fixed substrate 51 by a slight electrostatic attraction. Thus, the gap amount of the gap G can be changed in a state in which parallelism of the fixed reflection film 54 and the movable reflection film 55 are maintained.

In the embodiment, the holding portion 522 in the diaphragm shape has been exemplified, but the invention is not limited thereto. For example, holding portions which are disposed in a beam shape at intervals of an equal angle using a central point of a plane as a center.

Configuration of Casing

As illustrated in FIG. 4, the casing 6 includes a base 61 and a lid 62. The base 61 and the lid 62 are bonded, for example, by low melting point glass bonding in which a glass frit (low melting point glass) is used or adhering of an epoxy resin or the like. Thus, an accommodation space is formed inside and the wavelength variable interference filter 5 is accommodated in the accommodation space.

The base 61 is formed, for example, by stacking ceramics on a thin plate and includes a depression portion 611 in which the wavelength variable interference filter 5 can be accommodated. The wavelength variable interference filter 5 is fixed to the bottom surface of the depression portion 611 of the base 61 by, for example, a fixing material. A light passage hole 612 is formed in the bottom surface of the depression portion 611 of the base 61. The light passage hole 612 is formed to include a region overlapping the reflection films 54 and 55 of the wavelength variable interference filter 5. A cover glass 613 covering the light passage hole 612 is bonded to the base 61.

The lid 62 is a glass plate and is bonded to an end surface opposite to the bottom surface of the base 61.

Configuration of Filter Controller

The filter controller 18 is equivalent to a voltage controller and is configured to include a power supply voltage monitor 181, the bias driver 182, the gap detector 183, the feedback controller 184, and a microcomputer (microcontroller) 19, as illustrated in FIG. 4.

The filter controller 18 sets the dimensions of the gap G of the wavelength variable interference filter 5 to a value (a value corresponding to a target wavelength) based on a wavelength setting instruction from the controller 152A. That is, the filter controller 18 adjusts a driving voltage of each of the bias actuator 57 and the control actuator 58 that form the electrostatic actuator 56 based on the wavelength setting instruction and sets the dimensions of the gap G so that the wavelength of transmitted light of the wavelength variable interference filter 5 becomes the target wavelength.

The filter controller 18 is driven by supplying a plurality of powers from the power supplier 152B. Specifically, the power supplier 152B applies a first power supply voltage Va to the bias driver 182, applies a second power supply voltage Vb to the feedback controller 184, and applies a third power supply voltage Vc to the microcomputer 19. The first power supply voltage Va, the second power supply voltage Vb, and the third power supply voltage Vc are equivalent to a plurality of supply voltages.

The filter controller 18 performs a stopping process to be described below to reduce the driving voltage of the electrostatic actuator 56 to a predetermined value or less when one of the power supply voltages Va, Vb, and Vc is reduced. The predetermined value is an upper limit of a driving voltage range in which pull-in does not occur even when an erroneous operation of the filter controller 18 occurs and a driving voltage varies. In the embodiment, the filter controller 18 changes the driving voltage to 0 V.

Configuration of Bias Driver

The bias driver 182 is driven in accordance with the first power supply voltage Va and applies a bias voltage V1 to the bias actuator 57 based on a bias signal input from the microcomputer 19. The bias driver 182 includes, for example, a variable gain amplifier and applies the bias voltage V1 according to the bias signal to the bias actuator 57 by setting a gain based on the bias signal. The bias driver 182 is equivalent to a first driver and the bias voltage V1 is equivalent to a first driving voltage.

The bias driver 182 is normally driven when the first power supply voltage Va is at least equal to or greater than Vda (also referred to as a bias voltage threshold Vda).

Configuration of Gap Detector

The gap detector 183 detects the dimensions of the gap G from an electrostatic capacitance between the reflection films 54 and 55 and outputs a detection signal to the feedback controller 184. Specifically, the gap detector 183 includes a C-V conversion circuit (not illustrated) and converts the electrostatic capacitance between the reflection films 54 and 55 into a voltage value (a detection signal). As the C-V conversion circuit, for example, a switched capacitor circuit can be exemplified.

The gap detector 183 may output an analog signal as the detection signal or may output a digital signal as the detection signal. When the digital signal is output, the detection signal (the analog signal) from the C-V conversion circuit is input to an analog-to-digital converter (ADC) to be converted into a digital value.

Configuration of Feedback Controller

The feedback controller 184 is driven in accordance with the second power supply voltage Vb and applies a feedback voltage V2 to the control actuator 58 on the bias of a target value of the gap G input from the microcomputer 19 and a detection value input from the gap detector 183. The feedback controller 184 is equivalent to a second driver and the feedback voltage V2 is equivalent to a second driving voltage. Here, the target value is a detection value by the gap detector 183 when the dimensions of the gap G are set to a value corresponding to the target wavelength. The feedback controller 184 performs feedback control to adjust the feedback voltage V2 so that a difference value between the target value and the detection value becomes 0.

Figure 5:
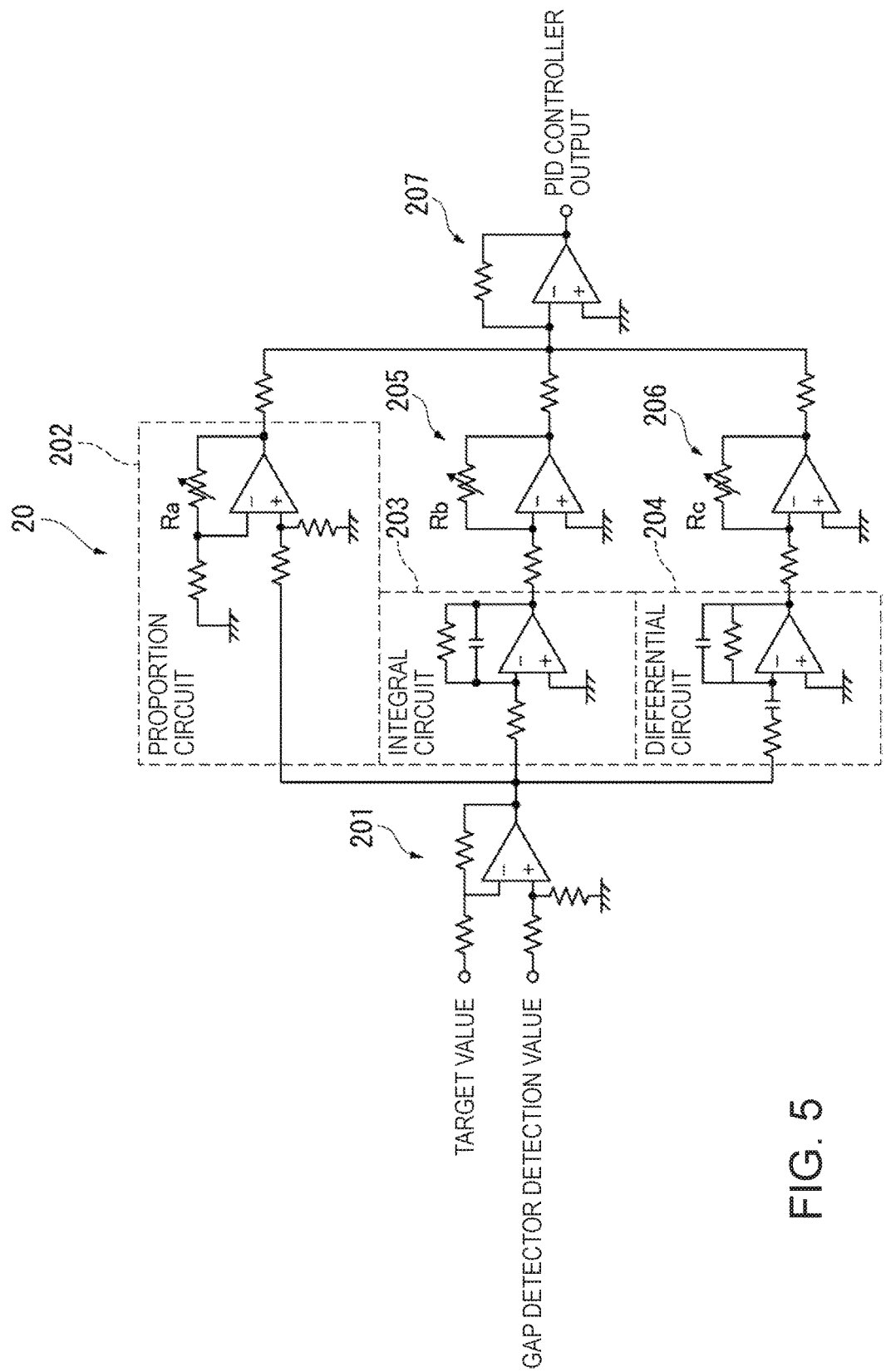
FIG. 5 is a diagram illustrating a schematic configuration of a PID controller included in a feedback controller according to the first embodiment.

FIG. 5 is a diagram illustrating a schematic configuration of a proportional-integral-differential (PID) controller 20 that configures the feedback controller 184.

The feedback controller 184 is configured to include the PID controller 20 (see FIG. 5) that obtains an output in accordance with a change in the detection value when the target value and the detection value are input and a driving circuit (not illustrated) that applies the feedback voltage V2 to the control actuator 58 based on an output from the PID controller 20.

As exemplified in FIG. 5, the feedback controller 184 can use the PID controller 20 configured with an analog circuit.

Specifically, the PID controller 20 includes a differential amplification circuit 201, a proportion circuit 202, an integral circuit 203, and a differential circuit 204 connected in parallel on an output side of the differential amplification circuit 201, a first amplification circuit 205 connected to an output side of the integral circuit 203, a second amplification circuit 206 connected to an output side of the differential circuit 204, and an addition circuit 207 connected to an output side of the proportion circuit 202, the first amplification circuit 205, and the second amplification circuit 206.

The differential amplification circuit 201 amplifies and outputs a difference value between the target value from the microcomputer 19 and the detection value of the gap detector 183.

The proportion circuit 202 amplifies an output (voltage) from the differential amplification circuit 201 at an amplification ratio according to a resistant value Ra of a variable resistor. Hereinafter, the resistant value Ra is also referred to as a proportion parameter Ra.

The integral circuit 203 outputs a voltage corresponding to time integration of the output from the differential amplification circuit 201. The first amplification circuit 205 amplifies the output (the voltage) of the integral circuit 203 at an amplification ratio according to a resistant value Rb of the variable resistor. Hereinafter, the resistant value Rb is also referred to as an integral parameter Rb.

The differential circuit 204 outputs a differential value (a voltage value) of the output from the differential amplification circuit 201. The second amplification circuit 206 amplifies an output (a voltage) of the differential circuit 204 at an amplification ratio according to a resistant value Rc of the variable resistor. Hereinafter, the resistant value Rc is also referred to as a differential parameter Rc.

The addition circuit 207 adds and amplifies the outputs (voltage values) of the proportion circuit 202, the first amplification circuit 205, and the second amplification circuit 206.

The feedback controller 184 that has the above-described configuration can change the parameters Ra, Rb, and Rc equivalent to driving parameters in response to a parameter setting instruction from the microcomputer 19. That is, the microcomputer 19 outputs a setting instruction indicating that values of the parameters Ra, Rb, and Rc are set to values according to the target wavelength to the feedback controller 184 other than a target instruction including the target value. The feedback controller 184 sets the parameters Ra, Rb, and Rc based on the setting instruction. Hereinafter, the parameters Ra, Rb, and Rc are also referred to as feedback parameters.

Configuration of Power Supply Voltage Monitor

Figure 6:
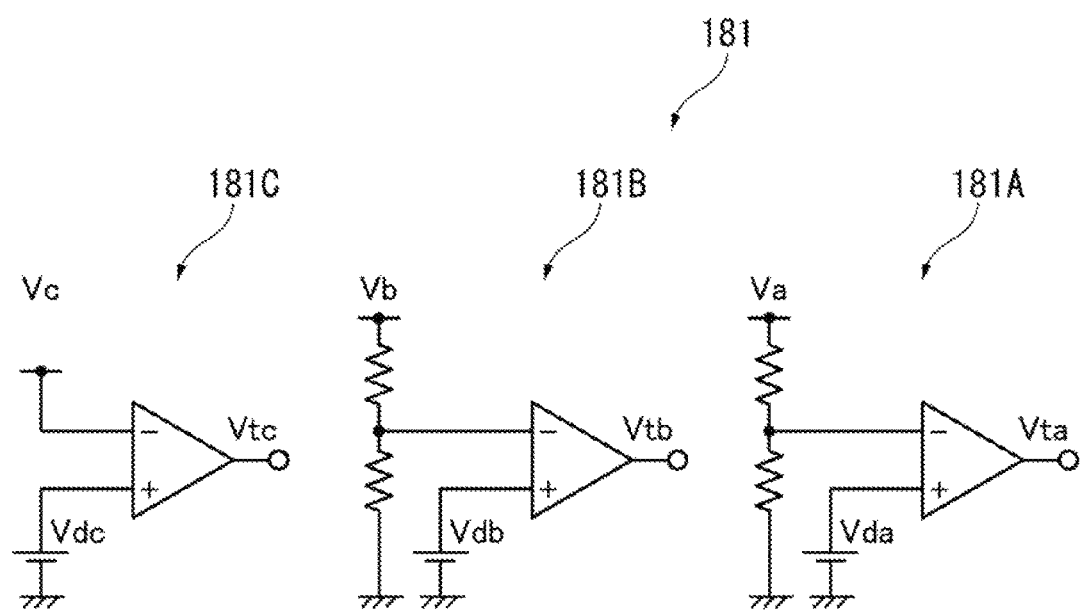
FIG. 6 is a diagram illustrating a schematic configuration of a power supply voltage monitor according to the first embodiment.
Figure 7:
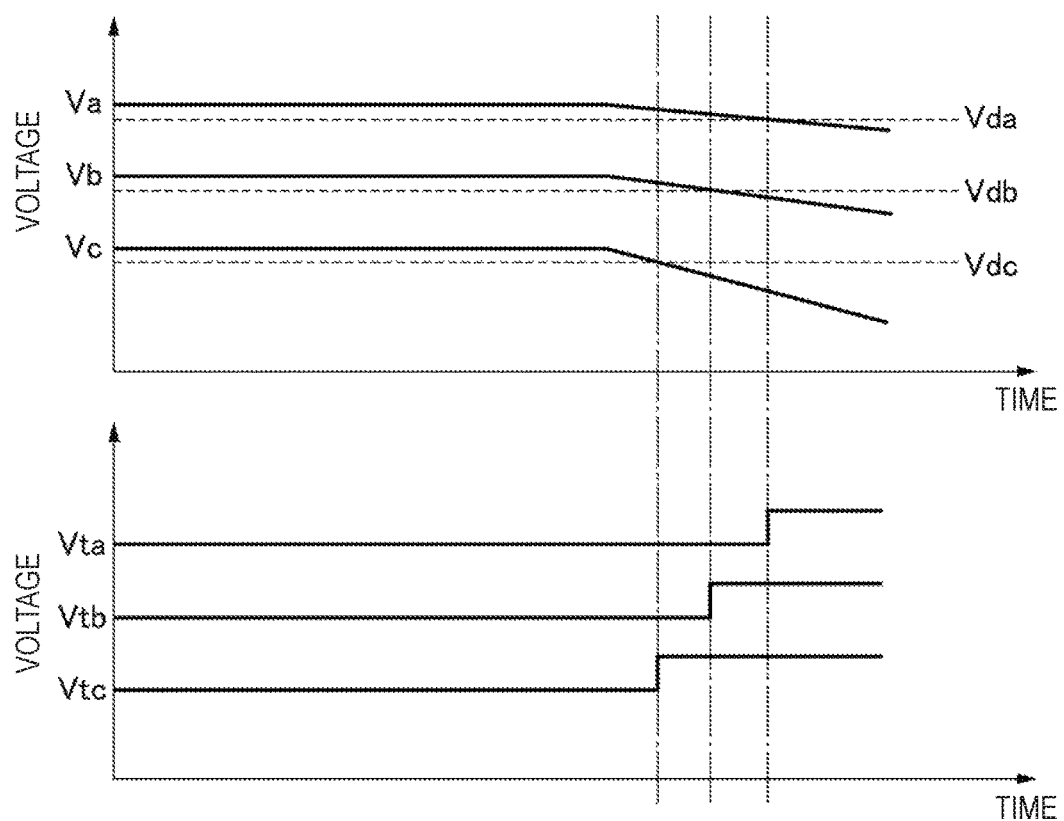
FIG. 7 is a diagram illustrating an example of a change in an output with respect to an input in the power supply voltage monitor.

FIG. 6 is a diagram illustrating a schematic configuration of the power supply voltage monitor 181. FIG. 7 is a diagram illustrating an example of an operation of the power supply voltage monitor 181 and a diagram illustrating an output value from the power supply voltage monitor 181 in regard to a change in each power supply voltage from the power supplier 152B.

The power supply voltage monitor 181 outputs detection signals (a first detection signal Vta, a second detection signal Vtb, and a third detection signal Vtc) indicating that the first power supply voltage Va, the second power supply voltage Vb, and the third power supply voltage Vc from the power supplier 152B are less than set thresholds, to the microcomputer 19 (see FIG. 4).

As illustrated in FIG. 6, the power supply voltage monitor 181 is configured to include a first comparator 181A, a second comparator 181B, and a third comparator 181C.

The first detection signal Vta output from the first comparator 181A is changed from a low level to a high level when the first power supply voltage Va applied to the bias driver 182 is reduced to be less than Vda (also referred to as a bias voltage threshold Vda) as illustrated in FIG. 7. The bias voltage threshold Vda is set to a value equal to or greater than a lower limit of a voltage range in which the bias driver 182 is normally driven. That is, the first comparator 181A can detect that the first power supply voltage Va is reduced and the first power supply voltage Va is less than the bias voltage threshold Vda while the bias driver 182 is normally driven.

The second detection signal Vtb output from the second comparator 181B is changed from the low level to the high level when the second power supply voltage Vb applied to the feedback controller 184 is less than Vdb (also referred to as a feedback voltage threshold Vdb). The feedback voltage threshold Vdb is set to a value equal to or greater than a lower limit of a voltage range in which the feedback controller 184 is normally driven.

The third detection signal Vtc output from the third comparator 181C is changed from the low level to the high level when a value of the third power supply voltage Vc applied to the microcomputer 19 is less than Vdc (also referred to as a microcomputer voltage threshold Vdc). The microcomputer voltage threshold Vdc is set to a value greater than an operation lower limit level $V_{Lim}c$ (see FIG. 11 or the like) of the microcomputer 19. Thus, before the third power supply voltage Vc is less than the operation lower limit level $V_{Lim}c$ of the microcomputer 19, a reduction in the third power supply voltage Vc is detected and the microcomputer 19 is notified of the reduction in the third power supply voltage Vc.

In the embodiment, a configuration in which the power supply voltage monitor 181 is driven in accordance with the third power supply voltage Vc will be exemplified as in the microcomputer 19. Here, as illustrated in FIG. 7, the third power supply voltage Vc is less than the first power supply voltage Va and the second power supply voltage Vb. Accordingly, in the first comparator 181A and the second comparator 181B, a resistor is disposed on an input side of an operational amplifier, and thus an input voltage to the operational amplifier is reduced. That is, in the embodiment, the bias voltage threshold Vda and the feedback voltage threshold Vdb are set in regard to the input voltage to be input to the operation amplifier via the resistor.

Configuration of Microcomputer

The microcomputer 19 is equivalent to a driving controller and includes a storage unit 191. For example, a relation (gap correlation data) between the dimensions of the gap G and the detection signal (voltage signal) detected by the gap detector 183 is stored in the storage unit 191. The storage unit 191 stores a relation between the feedback parameter and the target wavelength (the target value) of the wavelength variable interference filter 5.

As illustrated in FIG. 4, the microcomputer 19 functions as a voltage reduction detector 192, a bias instructor 193, and a feedback instructor 194.

Based on the detection signals Vta, Vtb, and Vtc from the power supply voltage monitor 181, the voltage reduction detector 192 detects that at least one of the power supply voltages Va, Vb, and Vc supplied from the power supplier 152B is less than the threshold. That is, the voltage reduction detector 192 detects that a voltage error occurs when at least one of the power supply voltages Va, Vb, and Vc of the power supplier 152B is reduced to a value less than the threshold.

The bias instructor 193 calculates a bias voltage V1 corresponding to the target wavelength and outputs a bias instruction indicating that the bias voltage V1 is applied to the bias actuator 57 to the bias driver 182. The bias instructor 193 reduces the bias voltage V1 to a value equal to or less than a predetermined value when the voltage error is detected.

The feedback instructor 194 calculates the target value of the dimensions of the gap G corresponding to the target wavelength and outputs a target instruction including the target value to the feedback controller 184. The feedback instructor 194 outputs a setting instruction indicating that the parameters Ra, Rb, and Rc are set to the feedback controller 184.

The feedback instructor 194 outputs the target instruction and the setting instruction to the feedback controller 184 so that the feedback voltage V2 is reduced to a value equal to or less than the predetermined value when the voltage error is detected.

Method of Driving Wavelength Variable Interference Filter

Figure 8:
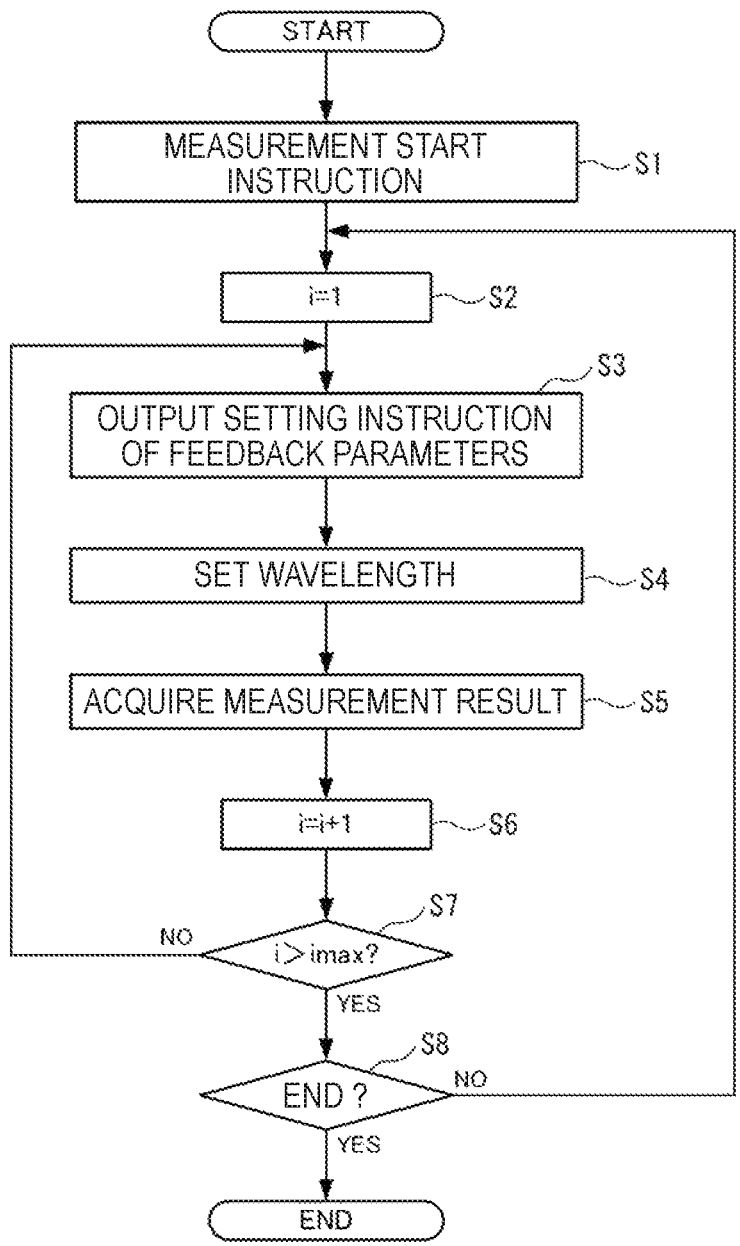
FIG. 8 is a flowchart illustrating an example of a spectrometry process according to the first embodiment.
Figure 9:
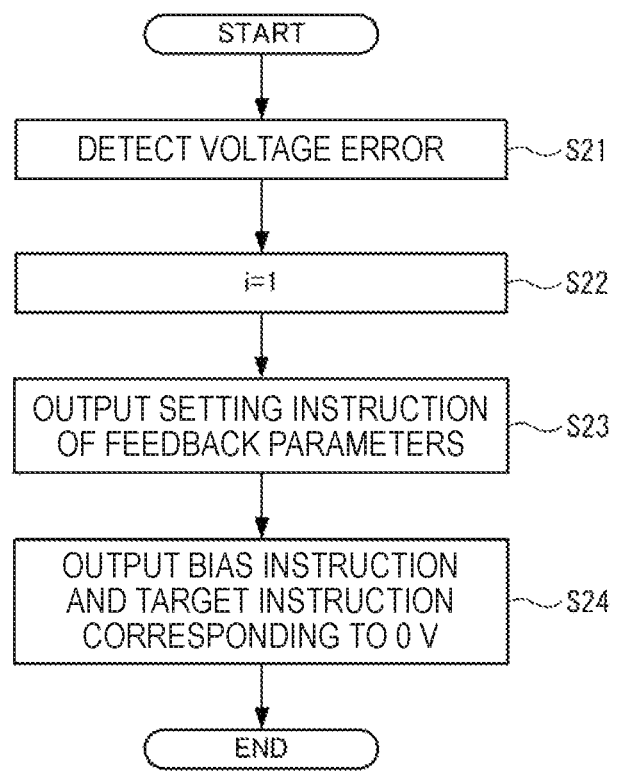
FIG. 9 is a flowchart illustrating an example of a stopping process according to the first embodiment.

FIG. 8 is a flowchart illustrating an example of a spectrometry process by the printer 10. FIG. 9 is a flowchart illustrating an example of a method of driving the wavelength variable interference filter when a voltage error occurs. FIG. 10 is a diagram illustrating examples of feedback parameters according to the first embodiment. FIGS. 11 to 14 are diagrams illustrating changes in the power supply voltages Va, Vb, and Vc when a voltage error occurs and a relation between the bias voltage V1 and the feedback voltage V2.

In the printer 10, when an instruction to start the spectrometry process is input from the external apparatus 30 or an operation input unit (not illustrated), the controller 15 turns on the light source unit 171 of the spectroscope 17 and causes the filter controller 18 to start the spectrometry process. The filter controller 18 causes the electrostatic actuator 56 to sequentially apply the driving voltage corresponding to a wavelength for each predetermined interval (for example, an interval of 20 nm) in a predetermined measurement target wavelength band (for example, the visible light band) and acquires an amount of light received by the light receiver 173 as a spectrometry result.

In the following description, the target wavelength (measurement wavelengths) $\lambda$ is assumed to be associated with a wavelength variable i (where i=an integer of 1 to 16). For example, the wavelength variable i=1, 2, . . . , 16 are assumed to be associated with target wavelengths $\lambda$=700, 680, . . . , 400 nm, respectively.

Spectrometry Process

In the printer 10, when an instruction to start the spectrometry process is input from the external apparatus 30 or an operation input unit (not illustrated), the controller 15 turns on the light source unit 171 of the spectroscope 17 and causes the filter controller 18 to start the spectrometry process. The filter controller 18 causes the electrostatic actuator 56 to sequentially apply the driving voltage corresponding to a wavelength for each predetermined interval (an interval of 20 nm) in a predetermined measurement target wavelength band (the visible light band) and acquires an amount of light received by the light receiver 173 as a spectrometry result.

As illustrated in FIG. 8, the microcomputer 19 receives a measurement start instruction to start the spectrometry from the controller 15 and starts the spectrometry process (step S1).

First, the microcomputer 19 sets wavelength variable i of the storage unit 191 to 1 and initializes the wavelength variable i (step S2).

Subsequently, the feedback instructor 194 outputs the setting instruction indicating that the parameters Ra, Rb, and Rc (the feedback parameters) are set to values corresponding to the wavelength variable i to the feedback controller 184 (step S3).

The parameters Ra, Rb, and Rc are set in advance in regard to the target wavelength $\lambda$, that is, the wavelength variable i (see values at the normal time in FIG. 10). For example, in the case of wavelength variable i=1 (in the embodiment, in the case of the target wavelength $\lambda$=700 nm), the proportion parameter Ra is equal to 32 K($\Omega$), the integral parameter Rb is equal to 100 K($\Omega$), and the differential parameter Rc is equal to 95 K($\Omega$). The storage unit 191 stores a data table in which the wavelength variable i is associated with the setting value of the feedback parameter and the feedback instructor 194 outputs the setting instruction with reference to the data table. The feedback controller 184 changes the parameters Ra, Rb, and Rc based on the setting instruction.

Subsequently, the microcomputer 19 adjusts an application voltage of the electrostatic actuator 56 and sets the wavelength (the dimensions of the gap G) of the transmitted light of the wavelength variable interference filter 5 to a value according to the target wavelength $\lambda$ (the wavelength variable i) (step S4).

Specifically, the bias instructor 193 calculates the bias voltage V1 corresponding to the wavelength variable i (the target wavelength $\lambda$) and outputs a bias instruction indicating that the bias voltage V1 is set to the bias driver 182. The bias driver 182 applies the bias voltage V1 to the bias actuator 57 based on the bias instruction.

The feedback instructor 194 outputs a target instruction corresponding to the wavelength variable i (the target wavelength $\lambda$) to the feedback controller 184. The feedback controller 184 adjusts the feedback voltage V2 of the control actuator 58 based on the target instruction. The target instruction includes the target value matching the detection value of the gap detector 183 when the dimensions of the gap G is set to a value corresponding to the target wavelength $\lambda$. The storage unit 191 stores the data table in which the wavelength variable i is associated with the target value and the feedback instructor 194 acquires the target value with reference to the data table and outputs the target instruction.

Thus, the dimensions of the gap G of the wavelength variable interference filter 5 is set to a value corresponding to the target wavelength $\lambda$.

When the dimensions of the gap G are set to the value corresponding to the target wavelength $\lambda$ in step S4, the controller 15 acquires the amount of light received by the light receiver 173 as a measurement result (step S5).

Subsequently, the microcomputer 19 adds 1 to the wavelength variable i (step S6) and determines whether the wavelength variable i is greater than a maximum value imax (in the embodiment, imax=16) (step S7).

When the measurement results for all the target wavelengths $\lambda$ are not acquired and NO is thus determined in step S7, the microcomputer 19 performs a process subsequent to step S3.

Conversely, when the measurement results for all the target wavelengths $\lambda$ are acquired and YES is thus determined in step S7, it is determined whether an instruction to end the measurement is received (step S8).

When NO is determined in step S8, the microcomputer 19 performs the process subsequent to step S2. Conversely, when YES is determined in step S8, the microcomputer 19 ends the spectrometry process described in the present flowchart.

Stopping Process when Voltage Error is Detected

When a voltage error is detected by the power supply voltage monitor 181 at the time of performing the spectrometry process, the filter controller 18 sets the bias voltage V1 and the feedback voltage V2 to 0 V as an interruption process and performs a stopping process of stopping the driving of the wavelength variable interference filter 5.

Figure 11:
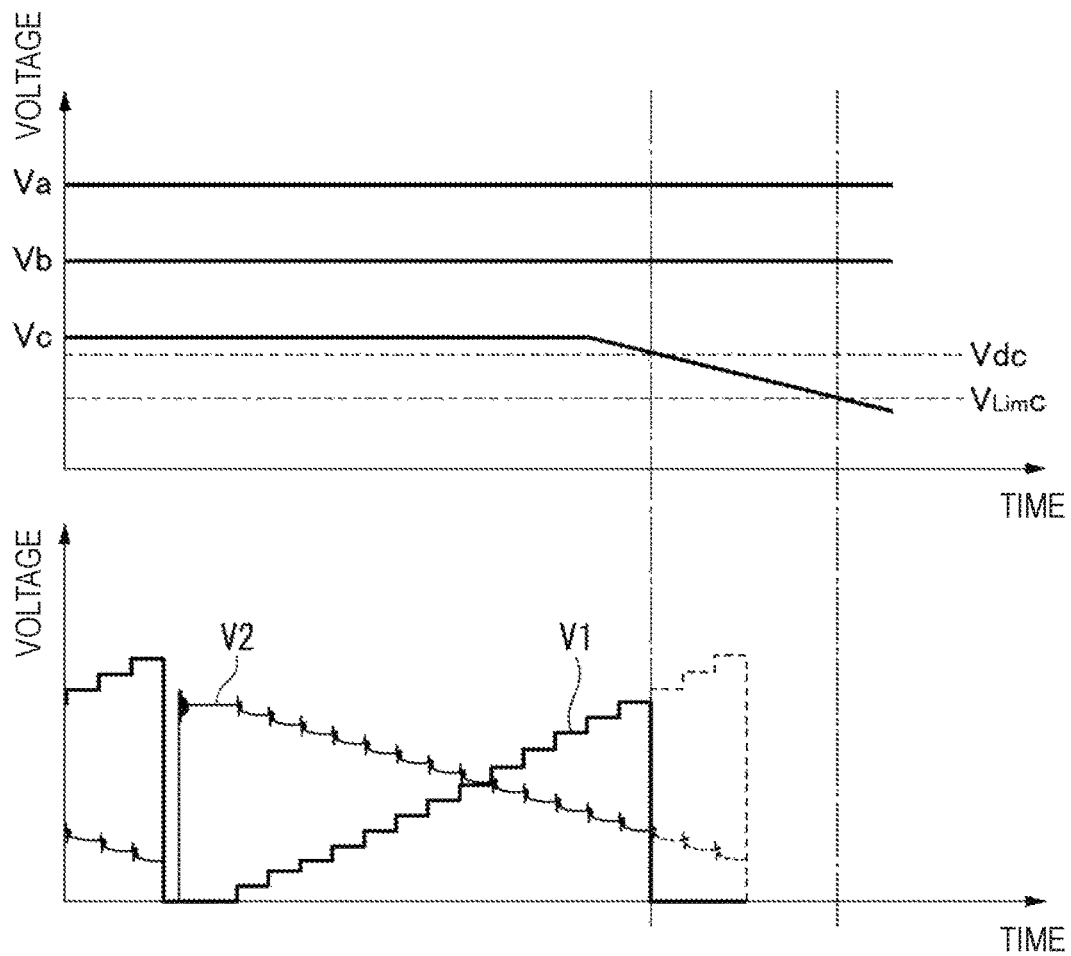
FIG. 11 is a diagram illustrating examples of a bias voltage and a feedback voltage with respect to the power supply voltage according to the first embodiment.

For example, as illustrated in FIG. 11, when the power supply voltages Va, Vb, and Vc are greater than the set voltage thresholds Vda, Vdb, and Vdc, that is, the power supply voltages are normal, the spectrometry process illustrated in FIG. 8 is performed. Conversely, as illustrated in FIG. 11, for example, when the third power supply voltage Vc applied to the microcomputer 19 is less than the microcomputer voltage threshold Vdc, the third detection signal Vtc output from the third comparator 181C is changed from the low level to the high level and a voltage error is detected by the voltage reduction detector 192.

As illustrated in FIG. 9, when the voltage error is detected by the voltage reduction detector 192 (step S21), the microcomputer 19 sets the wavelength variable i to i=1 corresponding to the maximum wavelength among the target wavelengths (step S22).

In the example illustrated in FIG. 11, since the voltage error is detected when the wavelength variable i is set to 13, the wavelength variable i is set to 1 without performing measurement corresponding to the wavelength variable i=14.

Subsequently, the feedback instructor 194 outputs the setting instruction indicating that the parameters Ra, Rb, and Rc (see FIG. 10) are set to values corresponding to the wavelength variable i=1 to the feedback controller 184 (step S23).

In the embodiment, when the application voltage to the electrostatic actuator 56 is 0 V, the parameters Ra, Rb, and Rc are set to the values corresponding to the wavelength variable i=1 (see a thick range at the time of the error detection in FIG. 10). The invention is not limited to the embodiment. The values of the parameters Ra, Rb, and Rc may be set separately when the application voltage to the electrostatic actuator 56 is 0.

When the values of the parameters Ra, Rb, and Rc are changed to the values corresponding to the wavelength variable i=1 in step S23, the microcomputer 19 outputs the bias instruction indicating that the bias voltage V1 is set to 0 V and the target instruction indicating that the feedback voltage V2 is set to 0 V (step S24).

Here, the target instruction indicating the feedback voltage V2 is set to 0 V is an instruction signal including the detection value of the gap detector 183 as the target value when the application voltage of the electrostatic actuator 56 is 0 V, that is, the initial state.

The bias driver 182 sets the bias voltage V1 which is the application voltage of the bias actuator 57 to 0 V based on the bias instruction.

The feedback controller 184 performs the feedback control so that a gap detection value becomes a target value corresponding to the initial state and finally sets the feedback voltage V2 which is the application voltage of the control actuator 58 to 0 V.

After the dimensions of the gap G of the wavelength variable interference filter 5 are stabilized to the initial state, the supply of the power by the controller 15 may be stopped. For example, when the microcomputer 19 detects that the gap detection value is stabilized to a value corresponding to the initial state, a supply stop instruction indicating stop of the power supply is output to the controller 15. The power supplier 152B of the controller 15 stops the power supply based on the supply stop instruction.

In the stopping process, as illustrated in FIG. 11, the case in which the third power supply voltage Vc applied to the microcomputer 19 is reduced has been described, but the invention is not limited thereto.

Figure 12:
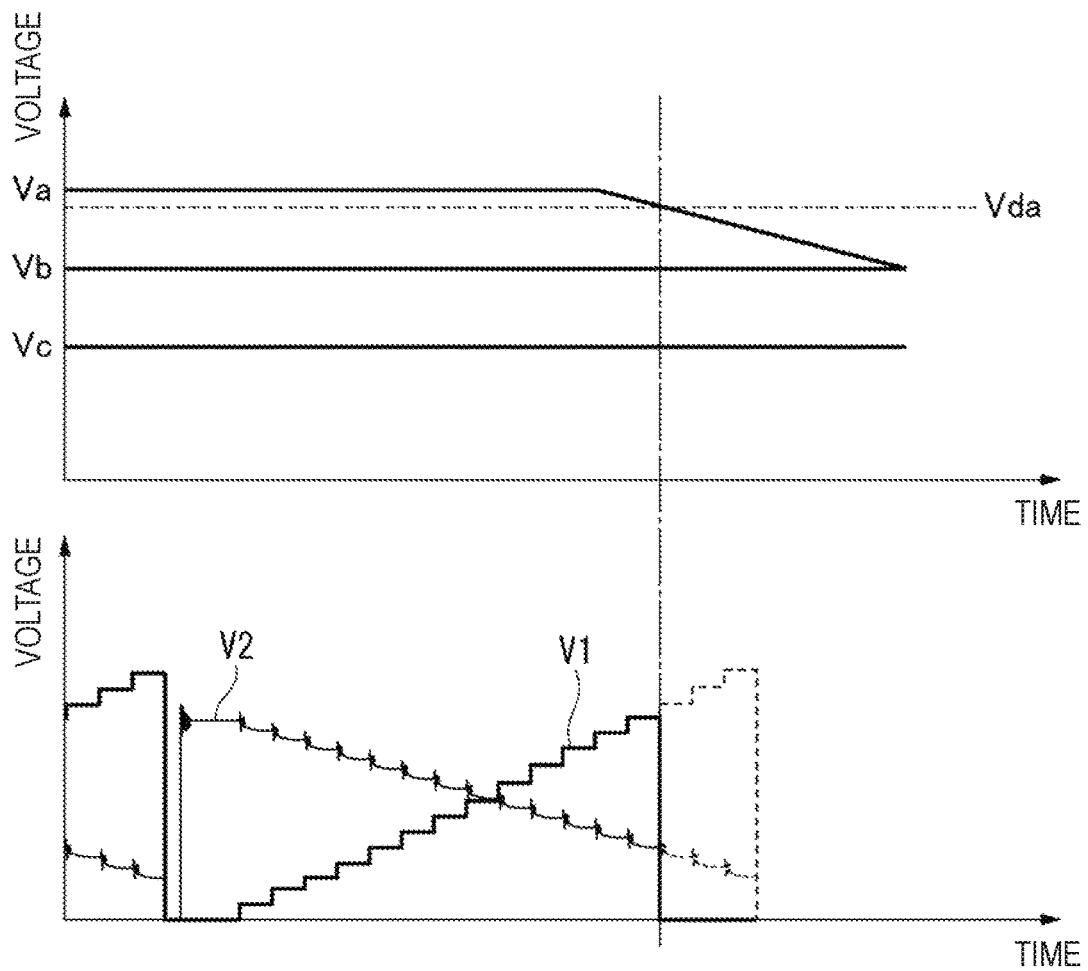
FIG. 12 is a diagram illustrating examples of the bias voltage and the feedback voltage with respect to the power supply voltage according to the first embodiment.
Figure 13:
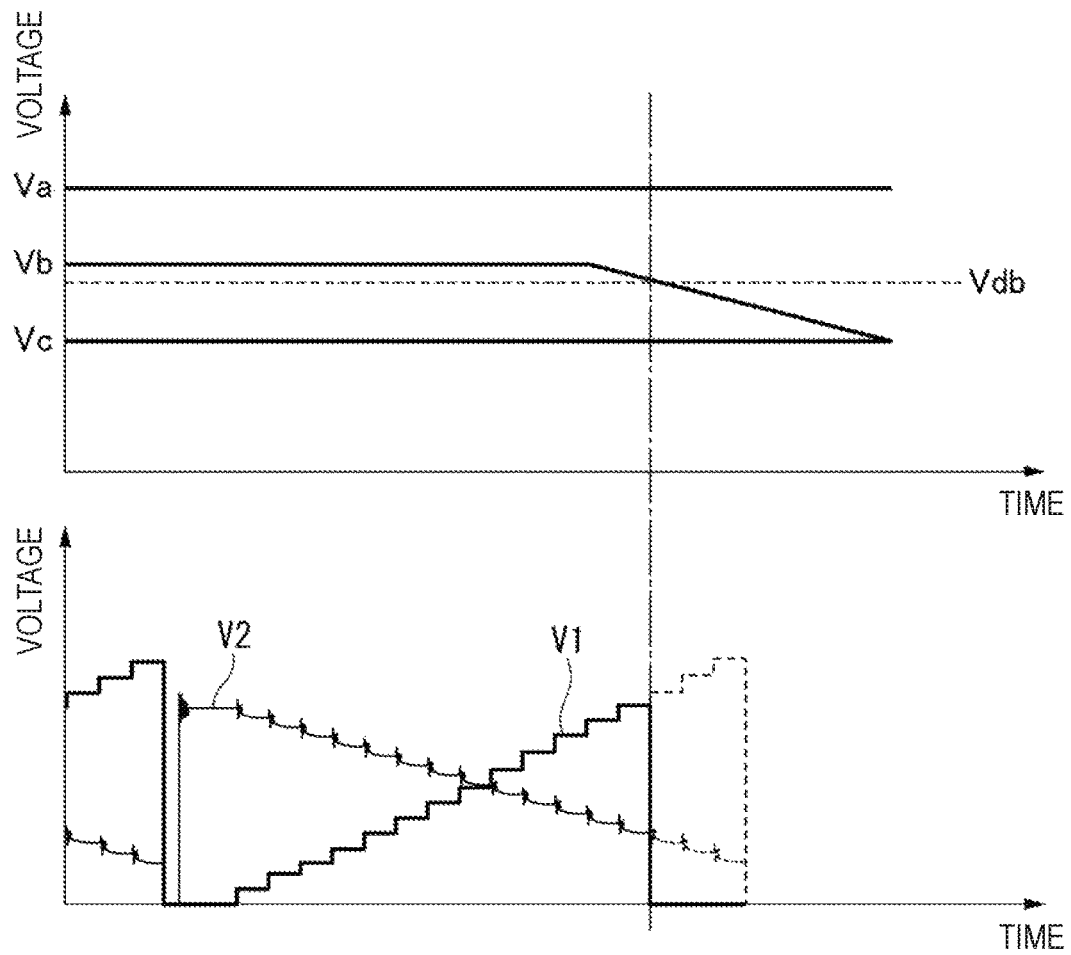
FIG. 13 is a diagram illustrating examples of the bias voltage and the feedback voltage with respect to the power supply voltage according to the first embodiment.

For example, when the first power supply voltage Va applied to the bias driver 182 is less than the bias voltage threshold Vda, as illustrated in FIG. 12, or when the second power supply voltage Vb applied to the feedback controller 184 is less than the feedback voltage threshold Vdb, as illustrated in FIG. 13, a reduction in the voltage is similarly detected by the voltage reduction detector 192.

Figure 14:
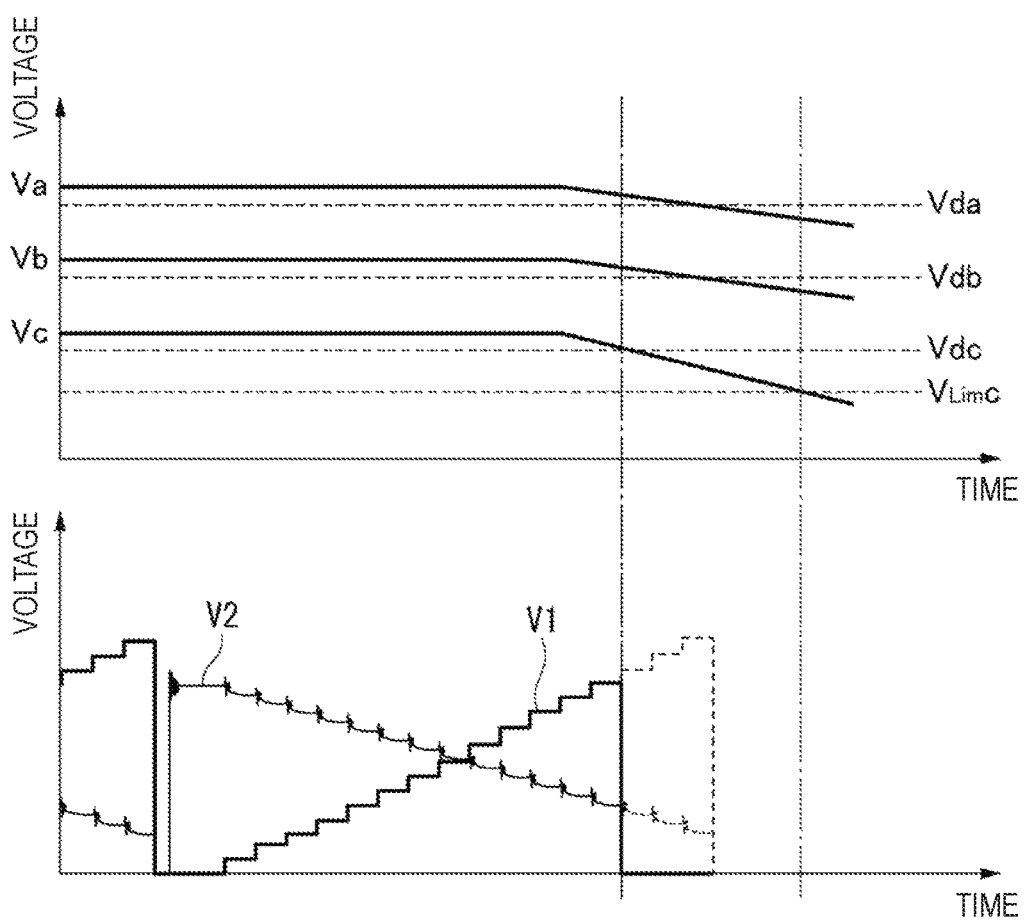
FIG. 14 is a diagram illustrating examples of the bias voltage and the feedback voltage with respect to the power supply voltage according to the first embodiment.

When two or more of the first power supply voltage Va, the second power supply voltage Vb, and the third power supply voltage Vc are simultaneously reduced, the foregoing stopping process is performed at a timing at which the reduction in the voltage is initially detected by the voltage reduction detector 192. For example, as illustrated in FIG. 14, when the first power supply voltage Va, the second power supply voltage Vb, and the third power supply voltage Vc are simultaneously reduced, the reduction in the voltage is detected by the voltage reduction detector 192 at a timing at which the third power supply voltage Vc is less than the microcomputer voltage threshold Vdc.

Operational Effects of First Embodiment

In the first embodiment configured as described above, the following operational effects can be obtained.

When a reduction in each of the power supply voltages Va, Vb, and Vc is less than a predetermined threshold and the voltage error occurs, there is a concern of an erroneous operation occurring in the bias driver 182, the feedback controller 184, and the microcomputer 19 of the filter controller 18. When the erroneous operation occurs, for example, a large driving voltage is applied to the electrostatic actuator 56, the reflection films 54 and 55 come into contact with each other (pull-in) and there is a concern of the wavelength variable interference filter 5 deteriorating. Due to the above-described erroneous operation, for example, there is a concern that the feedback control by the feedback controller 184 does not appropriately function and oscillation occurs.

On the other hand, the filter controller 18 reduces the driving voltage of the electrostatic actuator 56 at a time point at which the reduction in each of the power supply voltages Va, Vb, and Vc is less than the corresponding predetermined threshold and the voltage error is detected. Thus, it is possible to suppress inconvenience of pull-in, oscillation, or the like due to the erroneous operation and it is possible to suppress deterioration in the wavelength variable interference filter 5.

When a voltage error occurs, the filter controller 18 changes the driving voltages (the bias voltage V1 and the feedback voltage V2) to a predetermined value (a value at which the pull-in or oscillation does not occur due to an erroneous operation) or less. Thus, it is possible to suppress inconvenience of the pull-in, oscillation, or the like even when the power supply voltage is further reduced and the erroneous operation occurs in the filter controller 18, and thus it is possible to suppress deterioration in the wavelength variable interference filter 5.

By setting the driving voltage to 0 V as in the embodiment, for example, it is possible to perform a process of stopping the supply of the power to the controller 15 before the third power supply voltage Vc of the microcomputer 19 is less than the operation lower limit level $V_{Lim}c$ of the microcomputer 19.

The filter controller 18 reduces the feedback voltage V2 after the feedback parameter is changed. In this configuration, it is possible to perform appropriate feedback control based on the changed feedback parameter when the feedback voltage V2 is reduced.

The filter controller 18 reduces the driving voltage under the control of the microcomputer 19. Accordingly, it is possible to perform control such that the driving voltage is reduced after the change in the above-described feedback parameter and it is possible to stop the wavelength variable interference filter 5 more appropriately.

Second Embodiment

Hereinafter, a second embodiment will be described.

In the first embodiment, when a voltage error is detected, the filter controller 18 performs the stopping process so that the bias voltage V1 and the feedback voltage V2 become 0 V. In contrast, a second embodiment is different from the first embodiment in that the filter controller 18 reduces the bias voltage V1 and the feedback voltage V2 to 0 V step by step.

In the following description, the same reference numerals are given to the same configurations as those of the first embodiment. The description thereof will be omitted or simplified.

Figure 15:
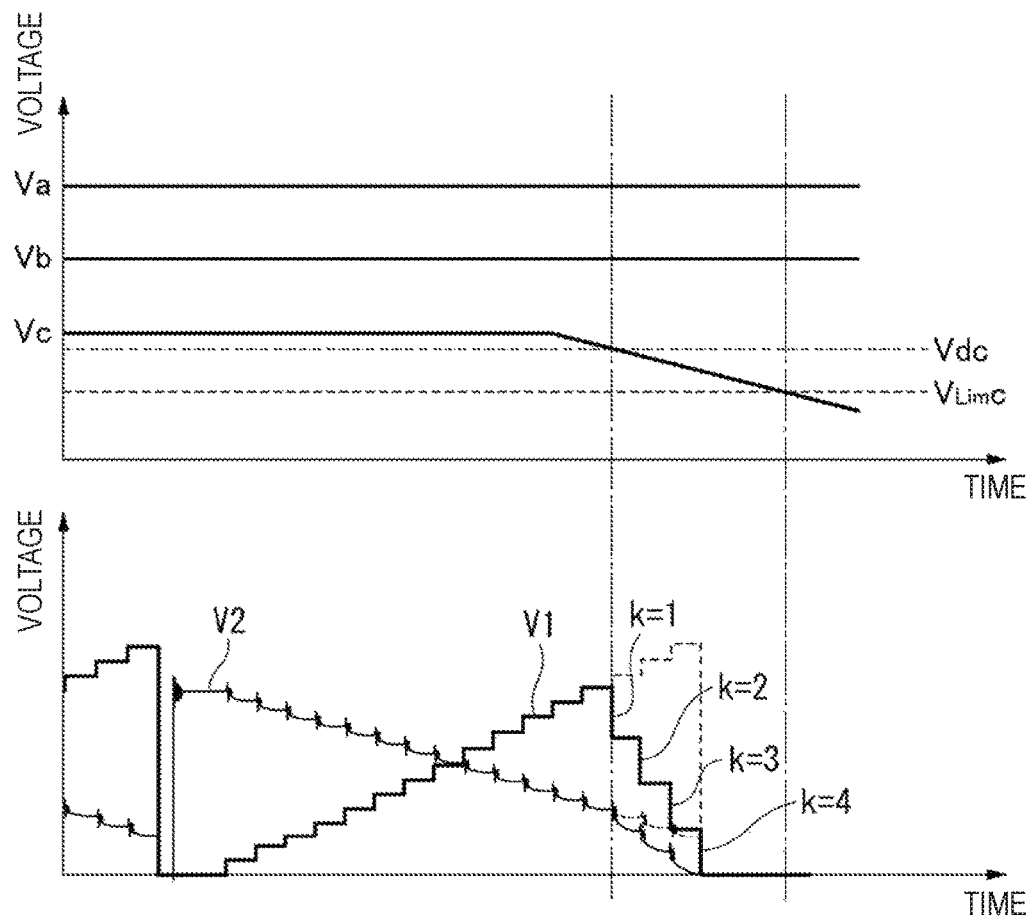
FIG. 15 is a diagram illustrating examples of the bias voltage and the feedback voltage with respect to the power supply voltage according to the second embodiment.
Figure 16:
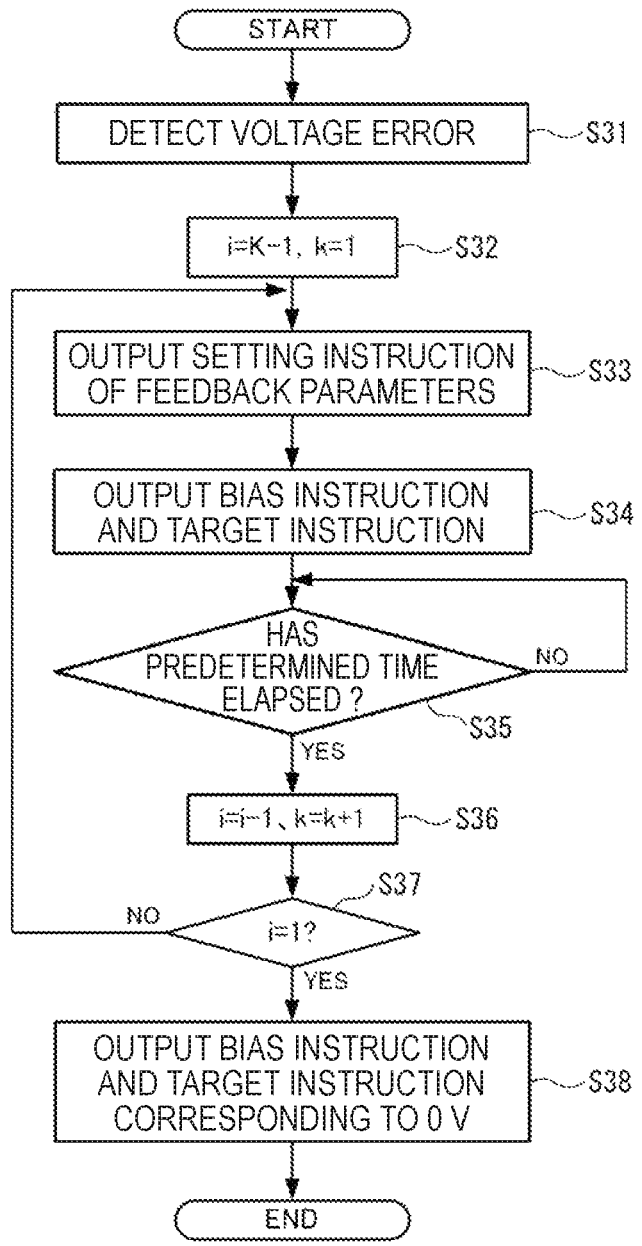
FIG. 16 is a flowchart illustrating an example of a stopping process according to a second embodiment.

FIG. 15 is a diagram illustrating a change in each power supply voltage when a voltage error occurs and a relation between the bias voltage V1 and the feedback voltage V2. FIG. 16 is a flowchart illustrating an example of a stopping process according to the second embodiment. FIG. 17 is a diagram illustrating examples of feedback parameters.

When a voltage error is detected at the time of performing a spectrometry process, the filter controller 18 performs the stopping process of reducing the bias voltage V1 and the feedback voltage V2 to 0 V step by step as in an interruption process whenever a predetermined time elapses, as illustrated in FIGS. 15 and 16.

In the embodiment, the microcomputer 19 changes the bias voltage V1 from a voltage value at the time of error detection to 0 V by reducing the bias voltage V1 step by step in k steps by a predetermined amount. On the other hand, the microcomputer 19 reduces the feedback voltage V2 step by step in K−1 steps in response to the change in the bias voltage V1. In FIG. 15, a case in which the number of steps K is 4 and the number of steps K (a maximum value of a step variable k) is a fixed value is exemplified.

For example, when the third power supply voltage Vc applied to the microcomputer 19 is less than the microcomputer voltage threshold Vdc, as illustrated in FIG. 15, a voltage error is detected by the voltage reduction detector 192, as illustrated in FIG. 16 (step S31).

When the voltage error is detected, the microcomputer 19 sets the wavelength variable i to K−1 and sets the step variable k to 1 (step S32). Here, the step variable k is a variable corresponding to each step when the voltage is reduced step by step. In the embodiment, the wavelength variable i is initially set to 3.

Subsequently, the feedback instructor 194 outputs the setting instruction to set the parameters Ra, Rb, and Rc to values (see a thick range when the voltage error occurs in FIG. 17) corresponding to the wavelength variable i (where i=1 to 3 in FIG. 15) to the feedback controller 184 (step S33).

The feedback controller 184 changes the values of the parameters Ra, Rb, and Rc according to the setting instruction. Even in the embodiment, the parameters Ra, Rb, and Rc are set to values corresponding to the wavelength variable i=1 when the application voltage to the electrostatic actuator 56 is set to 0. However, the invention is not limited to the wavelength variable i=1. The values of the parameters Ra, Rb, and Rc may be separately set when the application voltage to the electrostatic actuator 56 is 0 V.

Subsequently, the microcomputer 19 outputs the bias instruction and the target instruction (step S34).

The bias driver 182 applies the bias voltage V1 based on the bias instruction to the bias actuator 57.

The feedback controller 184 performs the feedback control based on the target value and finally adjusts the feedback voltage V2 to be applied to the control actuator 58 to a value according to the target value.

Here, the bias instructor 193 acquires the bias voltage V1 based on the step variable k and outputs the bias instruction according to the bias voltage V1.

For example, the bias voltage V1 may be reduced step by step in the predetermined number of steps K by a predetermined amount. In this case, a voltage value at the time of error detection is set to Vo and a reduction amount in one step of the bias voltage V1 is Vo/K. The bias voltage V1 corresponding to the step variable k (where k=1 to K) is Vo−(Vo/K)× k.

As described above, when the bias voltage V1 is reduced step by step by the predetermined amount from the voltage value Vo at the time of error detection, for example, the feedback instructor 194 outputs the target instruction according to the bias voltage V1. That is, the feedback instructor 194 acquires the wavelength variable i associated with the bias voltage V1 which is the closest to the bias voltage V1 corresponding to the step variable k. Then, the feedback instructor 194 outputs the target instruction corresponding to the acquired wavelength variable i. Therefore, it is possible to suppress inconvenience in that the feedback control may not appropriately function, for example, by considerably increasing or considerably decreasing the target value with respect to the bias voltage V1.

Irrespective of the voltage value Vo at the time of error detection, the bias voltage V1 corresponding to the step variable k may be calculated in advance and the bias voltage V1 may be associated with the step variable k to be stored in the storage unit 191. In this case, the target value or the feedback parameter of the feedback controller 184 corresponding to the step variable k may be set in advance to be stored in the storage unit 191. In this case, it is not necessary to calculate the bias voltage V1 or the target value and it is possible to suppress an increase in a processing load on the microcomputer 19.

Subsequently, after the microcomputer 19 outputs the bias instruction and the target instruction in step S34, the microcomputer 19 determines whether a predetermined time has elapsed (step S35).

Here, the predetermined time is set to a time sufficient to output the bias instruction and the target instruction from the microcomputer 19 and then acquire an amount of light (measurement value) received by the light receiver 173. That is, the predetermined time includes a stabilization time in which the dimensions of the gap G of the wavelength variable interference filter 5 are stabilized after the change in the bias voltage V1 and the feedback voltage V2 and a measurement time in which the measurement value is acquired.

When NO is determined in step S35, the microcomputer 19 repeats the determination. When YES is determined, the microcomputer 19 reduces the wavelength variable i by 1 and adds 1 to the step variable k (step S36).

Subsequently, the microcomputer 19 determines whether the wavelength variable i=1 (step variable k=K−1) is satisfied (step S37).

When the wavelength variable i is not 1 (NO in step S37), the process returns to step S33 and the subsequent process is performed.

Conversely, when YES is determined in step S37, the microcomputer 19 outputs the bias instruction and the target instruction corresponding to the bias voltage V1=0 (step S38).

Here, when the wavelength variable i=1 (step variable k=K−1), the feedback voltage V2 has already become 0 V. In the embodiment, the microcomputer 19 does not change the values of the feedback parameters and outputs the bias instruction and the target instruction corresponding to a case in which the application voltage to the electrostatic actuator 56 is 0 V, that is, the dimensions of the gap G are initial values.

In the second embodiment, the bias voltage V1 is reduced to 0 V in four steps and the feedback voltage V2 is reduced to 0 V in three steps, that is, the bias voltage V1 and the feedback voltage V2 are reduced to 0 V in the mutually different numbers of steps. However, the invention is not limited thereto. The bias voltage V1 and the feedback voltage V2 may be changed to 0 V in the same number of steps.

Operational Effects of Second Embodiment

In the second embodiment configured as described above, the following operational effects can be obtained in addition to the operational effects of the first embodiment.

When the voltage error occurs, the filter controller 18 can reduce a change amount of the driving voltage at the time of changing the driving voltage once by tapering the driving voltage to a value equal to or less than the predetermined value. Thus, it is possible to prevent control failure of a gap amount (the driving voltage of the electrostatic actuator 56) due to the abrupt change in the driving voltage at one time from occurring. For example, when the feedback voltage V2 is largely changed, the feedback control by the feedback controller 184 is not appropriately performed and there is a concern that oscillation occurs or the stabilization time increases. In contrast, in the embodiment, it is possible to prevent the control failure from occurring.

Third Embodiment

Hereinafter, a third embodiment will be described.

In the second embodiment, the filter controller 18 reduces the bias voltage V1 and the feedback voltage V2 to 0 V step by step when the voltage error is detected. In contrast, a third embodiment is different from the second embodiment in that the filter controller 18 changes the bias voltage V1 and the feedback voltage V2 to 0 V at a timing at which one of the power supply voltages is less than the second threshold when the bias voltage V1 and the feedback voltage V2 are reduced to 0 V step by step.

In the following description, the same reference numerals are given to the same configurations as those of the foregoing embodiments. The description thereof will be omitted or simplified.

Figure 18:
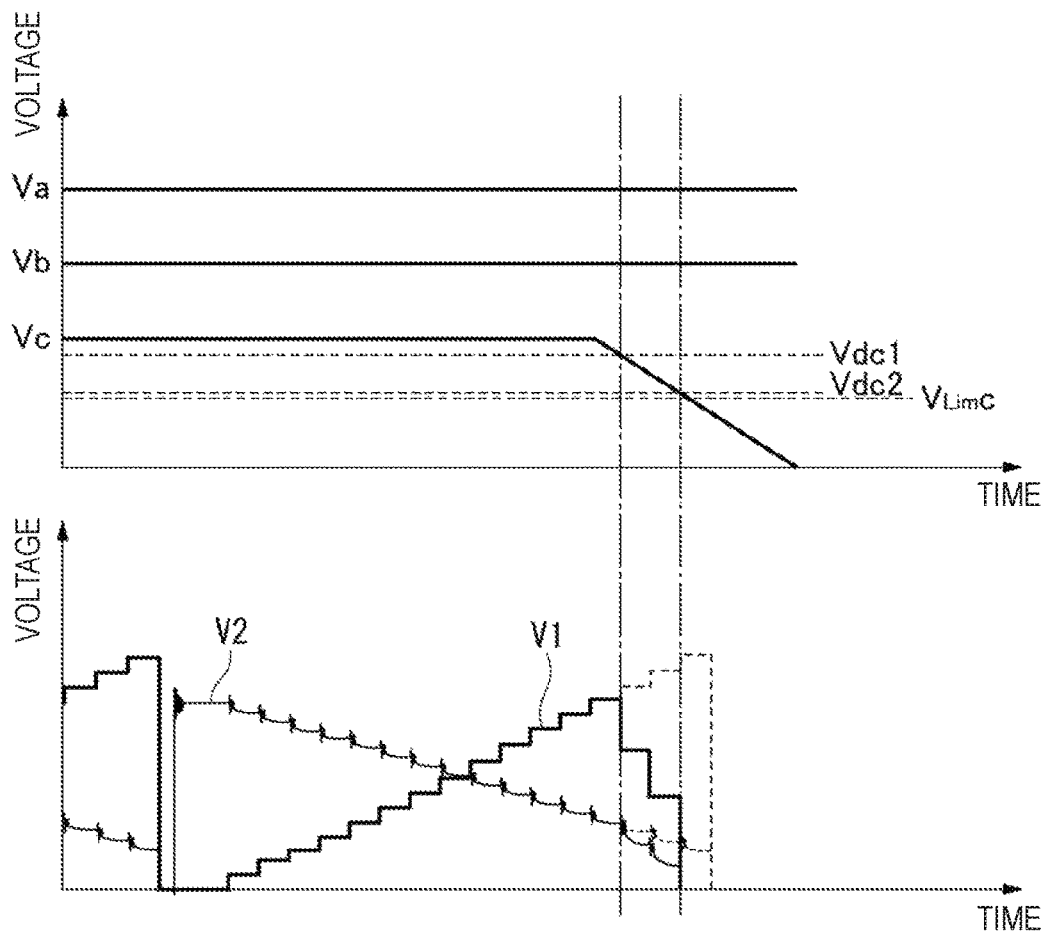
FIG. 18 is a diagram illustrating examples of a bias voltage and a feedback voltage with respect to the power supply voltage according to a third embodiment.

FIG. 18 is a diagram illustrating a change in each power supply voltage when a voltage error occurs and a relation between the bias voltage V1 and the feedback voltage V2.

As illustrated in FIG. 18, a first microcomputer voltage threshold Vdc1 and a second microcomputer voltage threshold Vdc2 less than the first microcomputer voltage threshold Vdc1 are set in regard to the third power supply voltage Vc. The voltage thresholds Vdc1 and Vdc2 are set to be values greater than the operation lower limit level $V_{Lim}c$ of the microcomputer. As exemplified in FIG. 18, the filter controller 18 reduces the bias voltage V1 and the feedback voltage V2 step by step when the third power supply voltage Vc is less than the first microcomputer voltage threshold Vdc1 and is equal to or greater than the second microcomputer voltage threshold Vdc2. The filter controller 18 sets the bias voltage V1 and the feedback voltage V2 to 0 V at a timing at which the third power supply voltage Vc is less than the second microcomputer voltage threshold Vdc2.

Specifically, when the third power supply voltage Vc is reduced to be less than the first microcomputer voltage threshold Vdc1, the microcomputer 19 performs a stopping process (hereinafter also referred to as a tapering process) according to the second embodiment illustrated in FIG. 16 as an interruption process in the spectrometry process.

When the third power supply voltage Vc is further reduced and is less than the second microcomputer voltage threshold Vdc2 at the time of performing the tapering process, the microcomputer 19 performs the stopping process of the first embodiment illustrated in FIG. 8 as the interruption process in the tapering process.

To detect that the third power supply voltage Vc is less than the voltage thresholds Vdc1 and Vdc2, as in the foregoing embodiments, the power supply voltage monitor 181 may include comparators corresponding to the voltage thresholds Vdc1 and Vdc2.

As described above, the case in which two thresholds are set in regard to the third power supply voltage Vc has been described. Two thresholds (a first threshold and a second threshold less than the first threshold) are set in regard to the first power supply voltage Va and the second power supply voltage Vb.

Two thresholds may not be set in regard to all the power supply voltages Va, Vb, and Vc. However, by setting two thresholds in regard to the third power supply voltage Vc, it is possible to more reliably suppress an erroneous operation of the microcomputer 19.

Operational Effects of Third Embodiment

In the third embodiment configured as described above, the following operational effects can be obtained in addition to the operational effects of the first embodiment.

In the embodiment, the above-described first and second thresholds are set in regard to each of the power supply voltages Va, Vb, and Vc. When each of the power supply voltage Va, Vb, and Vc is less than the set first threshold, that is, a voltage error occurs, the filter controller 18 can reduce the driving voltage under appropriate control by the filter controller 18 as in the second embodiment by tapering the driving voltage of the electrostatic actuator 56.

When each of the power supply voltages Va, Vb, and Vc are reduced to be less than the set second threshold after a voltage error occurs, the filter controller 18 changes the driving voltage to the predetermined value or less. Thus, it is possible to reduce the driving voltage to the predetermined value or less before an erroneous operation of the voltage controller occurs, it is possible to suppress an influence of the erroneous operation, and thus it is possible to suppress deterioration in the wavelength variable interference filter 5. By setting the driving voltage to 0 V as in the embodiment, the process of stopping supply of the power to the controller 15 can also be performed before the third power supply voltage Vc of the microcomputer 19 is less than the operation lower limit level $V_{Lim}c$ of the microcomputer 19.

Modification Examples

The invention is not limited to the above-described embodiments and modification examples. The invention includes configurations obtained by modifications, improvements, and appropriately combining the embodiments within the scope of the invention.

Modification Example 1

In the foregoing embodiments, timings at which the bias voltage V1 and the feedback voltage V2 are reduced are set to be simultaneous, but the invention is not limited thereto. The timings may be set to be different.

Figure 19:
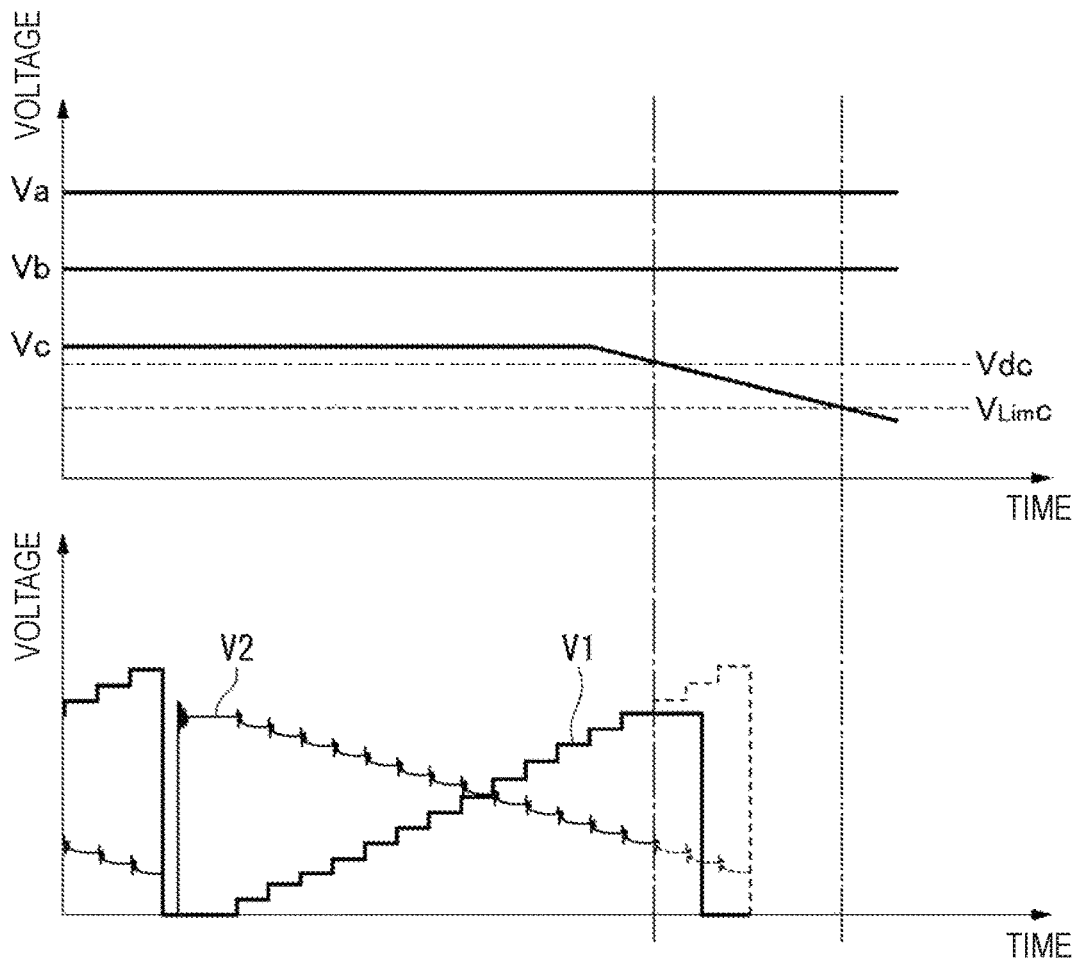
FIG. 19 is a diagram illustrating examples of a bias voltage and a feedback voltage with respect to the power supply voltage according to Modification Example 1.

FIG. 19 is a diagram illustrating a change in each power supply voltage when a voltage error occurs and a relation between the bias voltage V1 and the feedback voltage V2 according to Modification Example 1.

As illustrated in FIG. 19, when a voltage error occurs, the feedback voltage V2 may be set to 0 V while maintaining the bias voltage V1. Thereafter, the bias voltage V1 may be set to 0 V.

Specifically, for example, the feedback instructor 194 acquires a target value (a detection value of the gap detector 183 corresponding to the dimensions of the gap G) in a case in which the bias voltage V1 is not changed and the feedback voltage V2 is set to 0 V based on the wavelength variable i at the time of occurrence of a voltage error and outputs the target value to the feedback controller 184. The target value may be calculated in advance and stored in the storage unit 191. Thereafter, when the feedback voltage V2 is stabilized to 0 V and the detection value of the gap detector 183 is not varied, the bias instructor 193 outputs a bias instruction indicating that the bias voltage V1 is set to 0 V and the feedback instructor 194 outputs a target instruction corresponding to an initial gap.

In this way, by changing the feedback voltage V2 after a voltage error occurs and before the bias voltage V1 is changed, it is possible to reduce the feedback voltage V2 before an erroneous operation of the filter controller 18, that is, under appropriate feedback control.

By changing the feedback voltage V2 without changing the bias voltage V1, it is possible to perform change in the gap G by the feedback controller 184 more reliably and quickly.

The target value when the bias voltage V1 is set to 0 V can be calculated easily according to the feedback voltage V2, that is, the wavelength variable i, and thus it is possible to suppress an increase in a processing load of the microcomputer 19.

In the foregoing process, the feedback instructor 194 may change the feedback parameter to a value corresponding to a case in which the voltages V1 and V2 are 0 V (for example, a value corresponding to the wavelength variable i=1) after the feedback voltage V2 is changed to 0 V and before the bias voltage V1 becomes 0 V. The timing at which the feedback instructor 194 changes the feedback parameter may be a timing before the feedback voltage V2 is changed to 0 V.

The bias voltage V1 and the feedback voltage V2 may be tapered.

Modification Example 2

Figure 20:
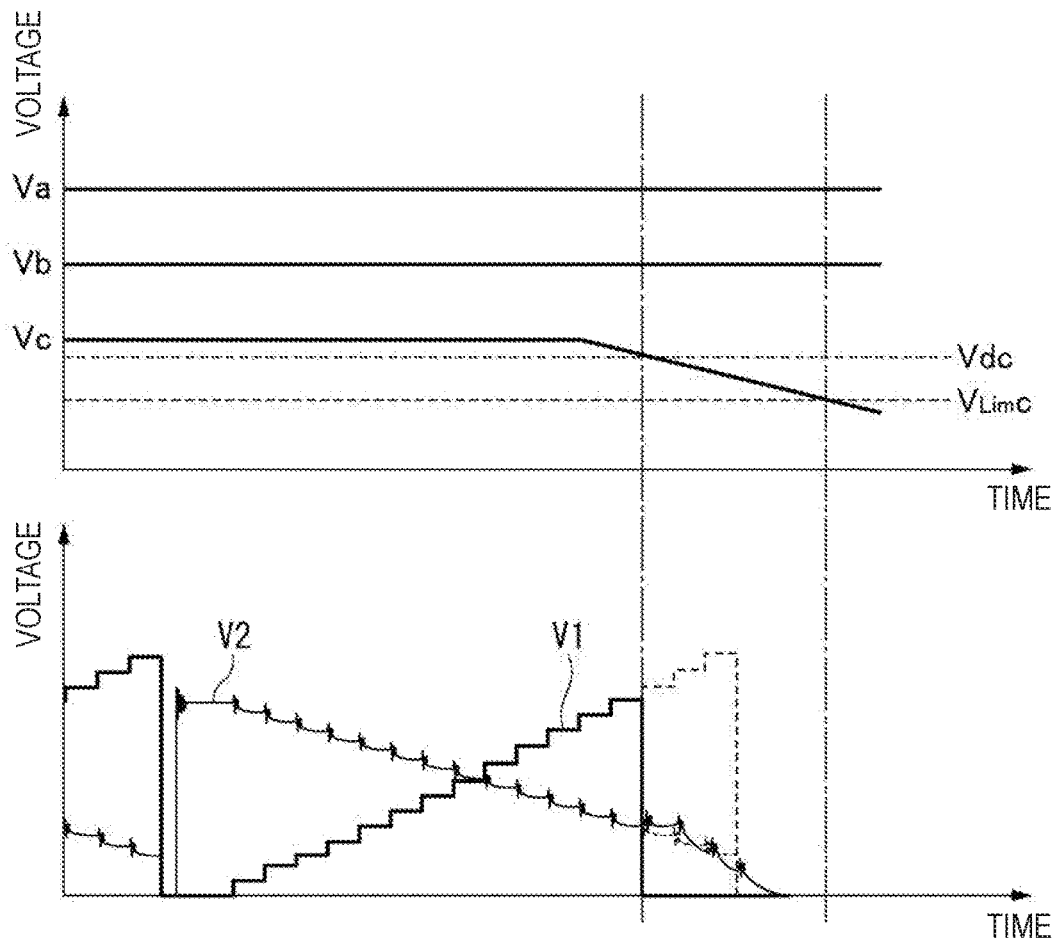
FIG. 20 is a diagram illustrating other examples of a bias voltage and a feedback voltage with respect to the power supply voltage according to Modification Example 2.

FIG. 20 is a diagram illustrating a change in each power supply voltage when a voltage error occurs and a relation between the bias voltage V1 and the feedback voltage V2 according to Modification Example 2.

As illustrated in FIG. 20, when a voltage error occurs, the feedback voltage V2 may be set to 0 V while reducing the feedback voltage V2 step by step after the bias voltage V1 is set to 0 V equal to or less than a predetermined value.

Specifically, for example, the bias instructor 193 outputs a bias instruction indicating that the bias voltage V1 is set to 0 V and the feedback instructor 194 outputs a target instruction. Here, the feedback instructor 194 outputs a target value corresponding to a case in which the bias voltage V1 is set to 0 V and the feedback voltage V2 is maintained to a value at the time of occurrence of a voltage error. For example, the feedback instructor 194 changes the target value sequentially whenever each predetermined time equal to or greater than a stabilization time elapses, and reduces the feedback voltage V2 step by step.

The feedback instructor 194 may change the feedback parameter before the bias voltage V1 is changed. As the feedback parameter, for example, a value corresponding to the step variable k or the wavelength variable i=1 or a value corresponding to a case in which the application voltage of the electrostatic actuator 56 is 0 V can be used.

Modification Example 3

In the foregoing second embodiment, the bias voltage V1 and the feedback voltage V2 are reduced step by step. However, while one of the bias voltage V1 and the feedback voltage V2 is changed to 0 V at the time of detecting a voltage error, the other voltage may be tapered.

Figure 21:
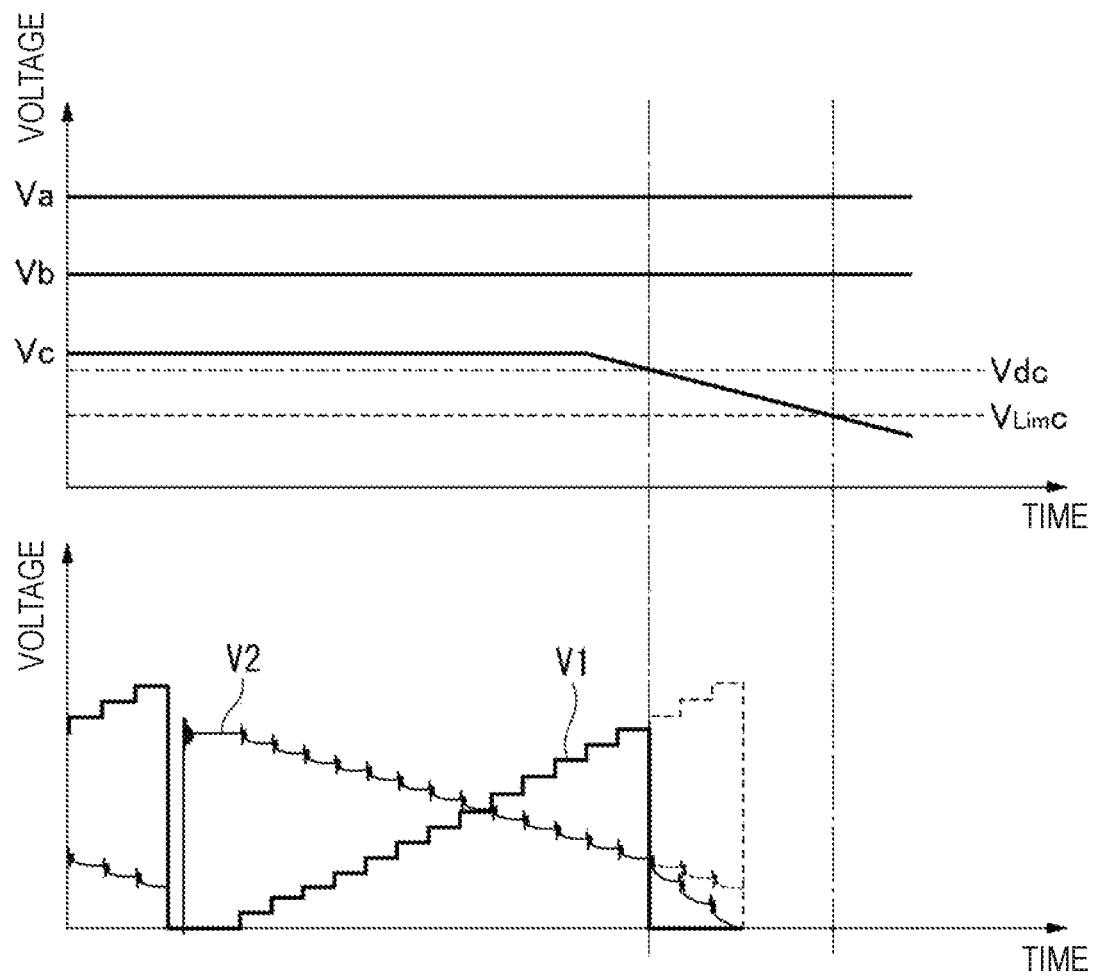
FIG. 21 is a diagram illustrating examples of a bias voltage and a feedback voltage with respect to the power supply voltage according to Modification Example 3.

FIG. 21 is a diagram illustrating a change in each power supply voltage when a voltage error occurs and a relation between the bias voltage V1 and the feedback voltage V2 according to Modification Example 3.

As illustrated in FIG. 21, when a voltage error occurs, the bias voltage V1 is set to 0 V and the feedback voltage V2 is reduced step by step. That is, the same process as the stopping process of the second embodiment is performed excluding the change in the bias voltage V1 to 0 V in one step.

For example, the feedback instructor 194 changes the feedback parameter when the voltage error is detected.

Thereafter, the bias instructor 193 outputs a bias instruction indicating that the bias voltage V1 is set to 0 V and the feedback instructor 194 outputs a target instruction. The feedback instructor 194 calculates a target value corresponding to the feedback voltage V2 based on the step variable k. Then, for example, the feedback instructor 194 changes the target value sequentially whenever a predetermined time equal to or greater than the stabilization time elapses, and reduces the feedback voltage V2 step by step. Thus, it is possible to quickly change the bias voltage V1 to 0 V at the time of occurrence of an error and it is possible to taper the feedback voltage V2 under appropriate feedback control. Since the bias voltage V1 is set to 0 V, it is easy to calculate the target value at the time of tapering the feedback voltage V2.

The feedback instructor 194 may set the feedback parameter to a value corresponding to the wavelength variable i (the step variable k) and may set the feedback parameter to a value corresponding to a case in which the application voltage to the electrostatic actuator 56 is 0 V.

Modification Example 4

In the foregoing embodiments, after the bias voltage V1 and the feedback voltage V2 are considered to be 0 V, the controller 15 stops the power supplier 152B based on a supply stop instruction from the microcomputer 19 and stops the supply of the power to the filter controller 18, but the invention is not limited thereto. For example, the unit control circuit 152 may include a switch that switches a connection state between the power supplier 152B and the filter controller 18 and may cause the switch to enter an off state.

Figure 22:
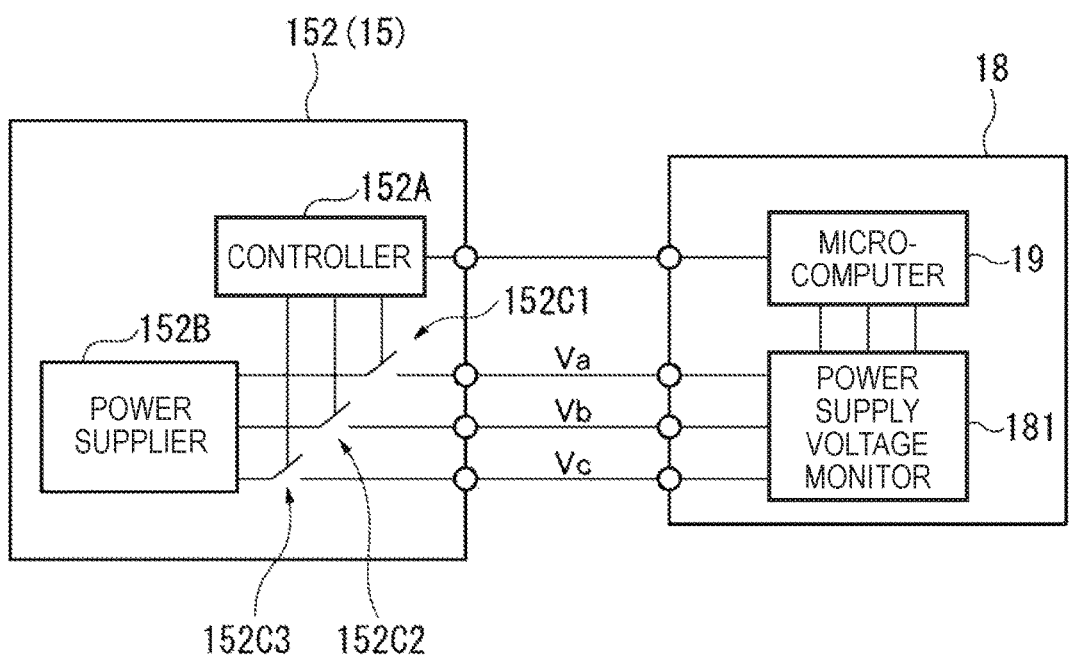
FIG. 22 is a diagram schematically illustrating main units of a controller and a filter controller according to Modification Example 4.

FIG. 22 is a diagram schematically illustrating main units of the controller 15 and the filter controller 18.

As illustrated in FIG. 22, the power supplier 152B is connected to the filter controller 18 by power supply wirings. The power supply wirings include a first wiring for applying the first power supply voltage Va, a second wiring for applying the second power supply voltage Vb, and a third wiring for applying the third power supply voltage Vc.

The unit control circuit 152 includes a first switch 152C1, a second switch 152C2, and a third switch 152C3 and is configured to be able to switch an ON state (connection state) and an OFF state (non-connection state) under the control of the controller 152A.

The first switch 152C1 switches connection between the first wiring and the power supplier 152B. In a state in which the first switch 152C1 is in the ON state, power can be supplied to the bias driver 182.

The second switch 152C2 switches connection between the second wiring and the power supplier 152B. In a state in which the second switch 152C2 is in the ON state, power can be supplied to the feedback controller 184.

The third switch 152C3 switches connection between the second wiring and the power supplier 152B. In a state in which the third switch 152C3 is in the ON state, power can be supplied to the microcomputer 19.

The controller 152A controls states of the switches 152C1, 152C2, and 152C3 based on instructions from the microcomputer 19. For example, when the voltage reduction detector 192 of the microcomputer 19 detects a voltage error based on detection signals (the first detection signal Vta, the second detection signal Vtb, and the third detection signal Vtc) from the power supply voltage monitor 181, a supply stop instruction indicating stop of the power supply is output to the controller 152A. The controller 152A switches the state of each of the switches 152C1, 152C2, and 152C3 from the ON state to the OFF state based on the supply stop instruction, and thus the power supplier 152B and the filter controller 18 enter the non-connection state.

In this way, by switching each of the switches 152C1, 152C2, and 152C3 to the OFF state based on an instruction from the microcomputer 19, it is possible to stop the supply of the power from the power supplier 152B to the filter controller 18.

The reduction in the power supply voltages Va, Vb, and Vc is caused due to short-circuiting of a circuit in the filter controller 18 in some cases. In this case, there is a concern of damage of the wavelength variable interference filter 5 due to an erroneous operation of the filter controller 18 or heating or damage of the filter controller 18 due to overcurrent. In contrast, in Modification Example 4, the connection between the power supplier 152B and the filter controller 18 can be cut as the OFF state of the switches 152C1, 152C2, and 152C3. Therefore, it is possible to more reliably prevent the inconvenience from occurring in the wavelength variable interference filter 5 or the filter controller 18.

When the voltage error is detected, the switches 152C1, 152C2, and 152C3 are assumed to enter the OFF state. However, for example, one of the switches 152C1, 152C2, and 152C3 entering the OFF state may be selected according to whether a reduction in one of the power supply voltages Va, Vb, and Vc occurs. For example, when the first power supply voltage Va applied to the bias driver 182 is reduced, only the first switch 152C1 may enter the OFF state, and thus the supply of the first power supply voltage Va may be stopped. In addition, the above-described stopping process may be performed in the case of the bias voltage V1=0 V. Even when the second power supply voltage Vb applied to the feedback controller 184 is reduced, only the second switch 152C2 may similarly enter the OFF state. When the voltages other than the third power supply voltage Vc applied to the microcomputer 19 are reduced, only the first switch 152C1 and the second switch 152C2 may enter the OFF state. Further, when the third power supply voltage Vc is reduced, all the switches 152C1, 152C2, and 152C3 may enter the OFF state.

Before the switches 152C1, 152C2, and 152C3 enter the OFF state, the stopping process described in the foregoing embodiments and modification examples may be performed. Thus, the power supply may be stopped after the wavelength variable interference filter 5 enters an initial state.

Modification Example 5

In the foregoing embodiments, when a voltage error occurs, the bias voltage V1 and the feedback voltage V2 are reduced under the control of the bias driver 182 and the feedback controller 184 by the microcomputer 19, but the invention is not limited thereto. For example, a switch circuit that turns off connection between the bias driver 182 and the bias actuator 57 and connection between the feedback controller 184 and the control actuator 58 based on detection signals of the power supply voltage monitor 181 may be included. In this configuration, it is possible to suppress an increase in a processing load by the stopping process in the microcomputer 19.

Figure 23:
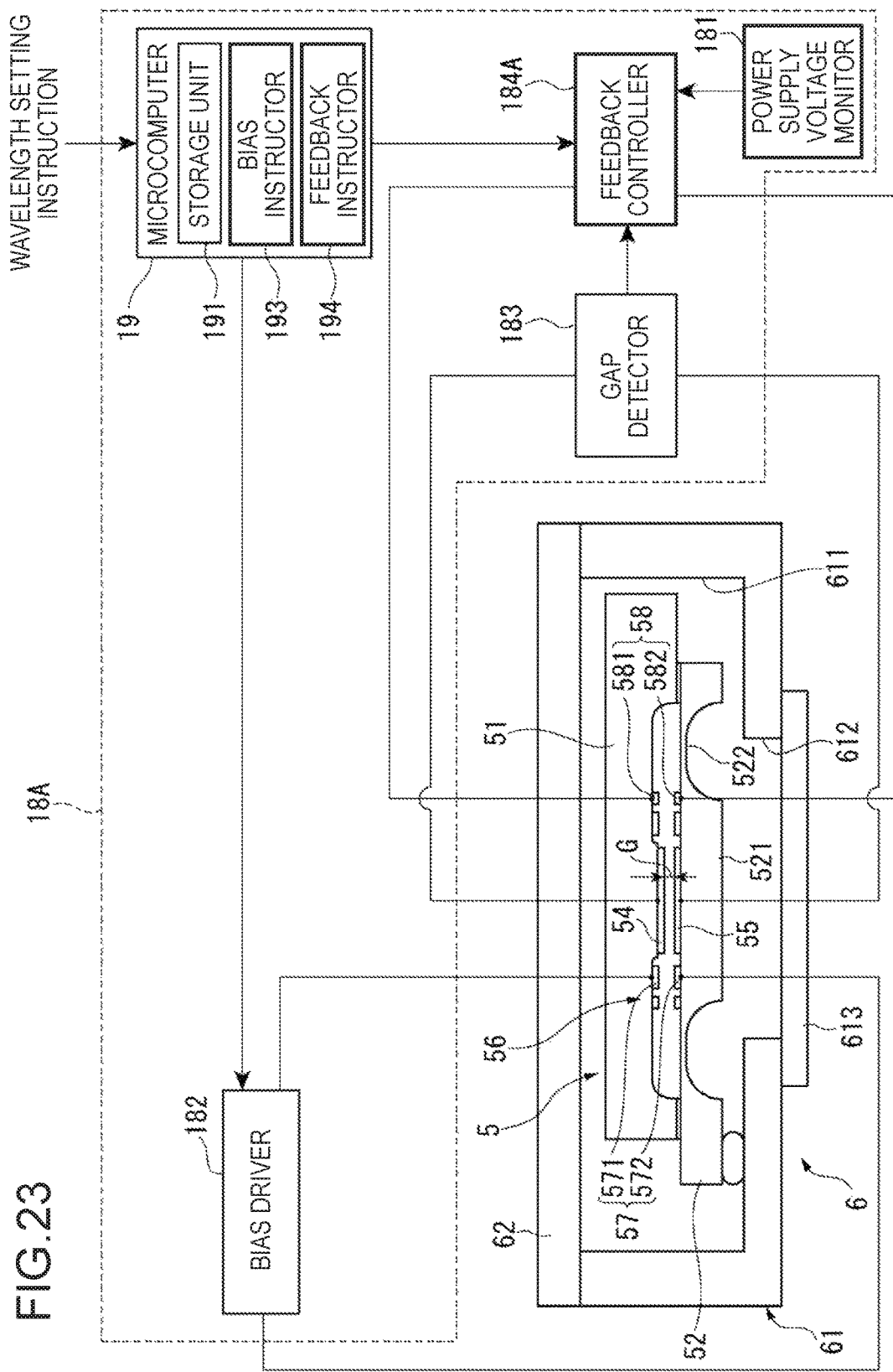
FIG. 23 is a diagram illustrating a schematic configuration of a filter controller according to Modification Example 5.
Figure 24:
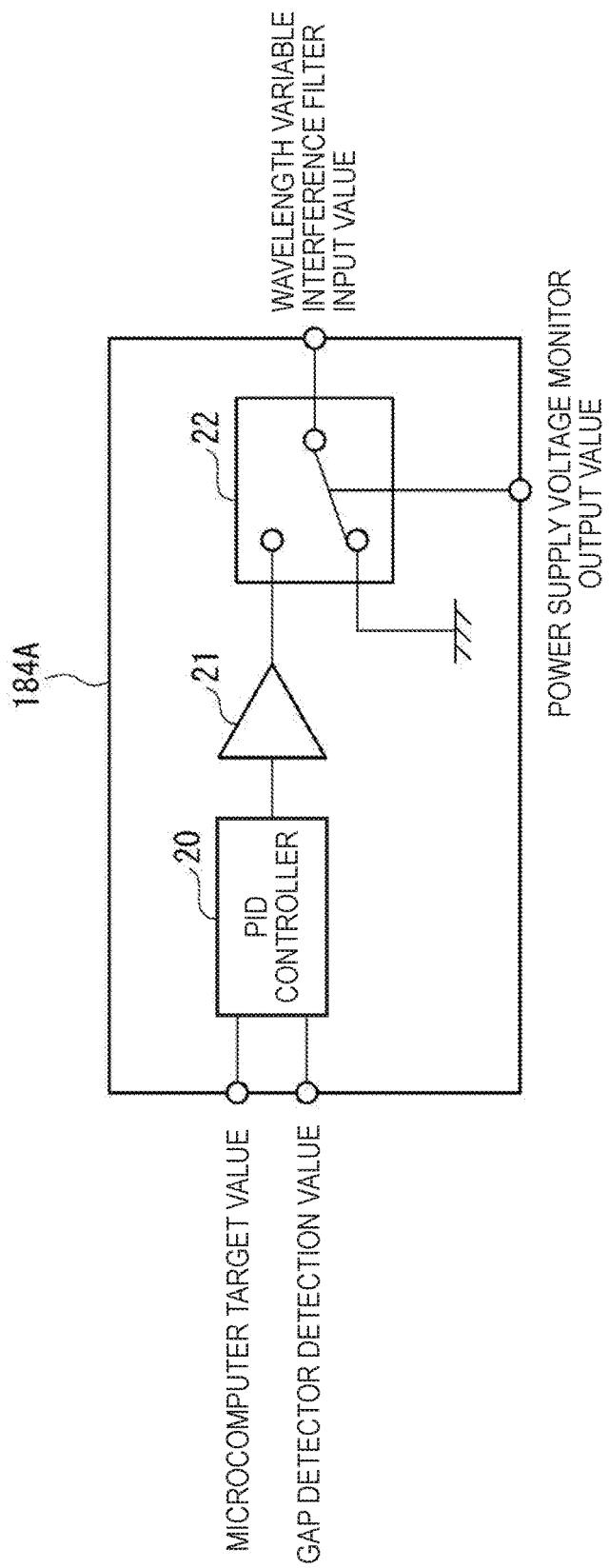
FIG. 24 is a diagram illustrating a schematic configuration of a feedback controller according to Modification Example 5.

FIG. 23 is a diagram illustrating a schematic configuration of a filter controller 18A according to Modification Example 5. FIG. 24 is a diagram illustrating a schematic configuration of a feedback controller 184A included in the filter controller 18A.

As illustrated in FIG. 23, in the filter controller 18A, a detection signal from the power supply voltage monitor 181 is input to the feedback controller 184A.

The feedback controller 184A includes a PID controller 20, a driving circuit 21, and a switch circuit 22, as illustrated in FIG. 24.

The driving circuit 21 is equivalent to an output unit and the feedback voltage V2 is applied to the control actuator 58 (see FIG. 23) of the wavelength variable interference filter 5 based on an output from the PID controller 20.

The switch circuit 22 switches a connection state between the driving circuit 21 and the control actuator 58 based on the detection signal from the power supply voltage monitor 181. That is, when each detection signal (the first detection signal Vta, the second detection signal Vtb, and the third detection signal Vtc) is low, the switch circuit 22 sets an ON state in which the driving circuit 21 and the control actuator 58 are connected to each other. When each detection signal is high, the switch circuit 22 sets an OFF state in which the driving circuit 21 and the control actuator 58 are not connected to each other.

The same switch circuit may be included in the bias driver 182. The detection signals from the power supply voltage monitor 181 may be input to the microcomputer 19. Thus, the microcomputer 19 can detect that a voltage error occurs. For example, it is possible to perform a process according to detection of the voltage error, such as stop of power supply or stop of a spectrometry process.

Other Modification Examples

In the foregoing second embodiment, the case in which the number of steps K at the time of reduction of the bias voltage V1 and the feedback voltage V2 step by step is a fixed value has been exemplified, but the number of steps K may be changed.

For example, the bias voltage V1 may be reduced by a predetermined reduction amount $\Delta V1$ from the voltage value Vo at the time of error detection step by step. In this case, the number of steps K can be obtained as a quotient obtained by dividing the voltage value Vo by the predetermined reduction amount $\Delta V1$. In this case, the bias voltage V1 corresponding to the step variable k (where k=1 to K) is $\Delta V1 \times (K-k)$. The feedback voltage V2 is reduced step by step by number of times according to the number of steps K. In this configuration, the number of steps K is changed according to the voltage value Vo at the time of detection of an error, but the bias voltage V1 and the feedback voltage V2 in each step can be calculated in advance.

In the foregoing embodiments and modification examples, the case in which the driving voltage of the electrostatic actuator 56 is reduced to 0 V when a voltage error occurs has been exemplified, but the invention is not limited thereto. For example, the driving voltage may be changed to a value equal to or greater than a predetermined value greater than 0 V. Thus, it is possible to suppress inconvenience of pull-in, oscillation, or the like due to an erroneous operation.

In the foregoing embodiments and modification examples, the configuration in which the electrostatic actuator 56 includes the bias actuator 57 and the control actuator 58 has been exemplified, but the invention is not limited thereto. For example, the electrostatic actuator 56 may be configured to include one of the bias actuator 57 and the control actuator 58.

In the foregoing embodiments, the carriage movement unit 14 that moves the carriage 13 in the X direction has been exemplified, but the invention is not limited thereto. For example, the carriage 13 may be fixed and the medium A may be moved with respect to the carriage 13. In this case, it is possible to suppress vibration of the wavelength variable interference filter 5 accompanied with movement of the carriage 13 and it is possible to stabilize the transmission wavelength of the wavelength variable interference filter 5.

The transport unit 12 that moves the medium A in the Y direction has been exemplified, but the invention is not limited thereto. For example, the carriage 13 may be moved in the Y direction with respect to the medium A.

In the foregoing embodiments, the ink jet printing unit 16 that ejects ink supplied from an ink tank by driving the piezoelectric elements has been exemplified as the printing unit 16, but the invention is not limited thereto. For example, the printing unit 16 may have a configuration in which bubbles are generated in ink by a heater and ink is ejected or a configuration in which ink is ejected by an ultrasonic vibrator.

The invention is not limited to the ink jet printer. For example, the invention is applicable to any type of printer such as a thermal printer using a thermal transfer scheme, a laser printer, or a dot impact printing apparatus.

In the foregoing embodiments, the light transmission type wavelength variable interference filter 5 that transmits light with a wavelength according to the gap G between the reflection films 54 and 55 from incident light has been exemplified as the wavelength variable interference filter 5, but the invention is not limited thereto. For example, a light reflection type wavelength variable interference filter that reflects light with a wavelength according to the gap G between the reflection films 54 and 55 may be used.

The optical filter device 172 in which the wavelength variable interference filter 5 is accommodated in the casing 6 has been exemplified, but the wavelength variable interference filter 5 may be installed directly in the spectroscope 17.

In the foregoing embodiments, the printer 10 including the spectroscope 17 as the optical module has been exemplified, but the invention is not limited thereto. For example, a color irregularity spectrometry apparatus that does not include an image forming unit and performs only a spectrometry process on the medium A may be used. For example, the optical module may be embedded in a quality inspection apparatus that inspects quality of a printing product manufactured in a factory or the like. The optical module according to the invention may also be embedded in any other apparatus.

The specific structures in the embodiments of the invention may be configured by combining the foregoing embodiments and modification examples within the scope of the invention or may be appropriately modified to other structures.

The entire disclosure of Japanese Patent Application No. 2016-230286 filed on Nov. 28, 2016 is expressly incorporated by reference herein.

What is claimed is:

1. An optical module comprising:
   a wavelength variable interference filter that includes:
   two reflection films facing each other via an inter-reflection-film gap; and
   first and second electrostatic actuators changing a gap amount of the inter-reflection-film gap; and
   a voltage controller that is driven in accordance with a plurality of supply voltages from a power supplier, the plurality of supply voltages including the first, second, and third voltages that are different from each other, the voltage controller including:
   a microcontroller configured to receive the first voltage and output a bias signal and a target gap value of the gap amount;
   a gap detector configured to detect the gap amount and to output a detected gap amount;
   a bias driver configured to receive a second voltage and the bias signal, the bias driver being configured to supply a bias voltage to the first electrostatic actuator in response to the bias signal from the microcontroller so as to drive the first electrostatic actuator; and
   a feedback controller configured to receive the third voltage and the target gap value, the feedback controller being configured to supply a feedback voltage to the second electrostatic actuator in response to the target gap value from the microcontroller and the detected gap amount from the gap detector so as to drive the second electrostatic actuator,
   wherein, when the microcontroller detects that one of the first, second, and third voltages is less than a predetermined threshold, the microcontroller is configured to change each of the bias voltage and the feedback voltage to a value equal to or less than a predetermined value.

2. The optical module according to claim 1, wherein, when the microcontroller detects that one of the first, second, and third voltages is less than a predetermined threshold, the microcontroller is configured to change each of the bias voltage and the feedback voltage to 0 volt.

3. The optical module according to claim 1, wherein, when the microcontroller detects that one of the first, second, and third voltages is less than a predetermined threshold, the microcontroller is configured to decrease each of the bias voltage and the feedback voltage.

4. The optical module according to claim 1, wherein, when the microcontroller detects that one of the first, second, and third voltages is less than a predetermined threshold, the microcontroller is configured to decrease the bias voltage after the microcontroller decreases the feedback voltage.

5. The optical module according claim 1, wherein the feedback controller is configured to perform feedback control in which the feedback controller makes the detected gap amount from the gap detector closer to the target gap value from the microcontroller, the feedback controller is configured to change a driving parameter in the feedback control, and when the microcontroller decreases the feedback voltage, the feedback controller changes the driving parameter.

6. The optical module according to claim 1, wherein the voltage controller includes a voltage monitor that outputs a detection signal to the feedback controller when the voltage monitor determines that one of the first, second, and third voltages is less than the predetermined threshold, the feedback controller includes an output unit and a switch circuit, the output unit outputs the feedback voltage, and the switch circuit is installed on an output side of the output unit and switches between a connected state in which the output unit and the second electrostatic actuator are connected and a non-connected state in which the output unit and the second electrostatic actuator are disconnected, and the switch circuit switches from the connected state to the non-connected state when the detection signal is input.

7. An electronic apparatus comprising:
an optical module that includes;
   a wavelength variable interference filter that includes;

two reflection films facing each other via an inter-reflection-film gap and;
first and second electrostatic actuators changing a gap amount of the inter-reflection-film gap; and
a voltage controller that is driven in accordance with a plurality of supply voltages from a power supplier, the plurality of supply voltages including first, second, and third voltages that are different from each other, the voltage controller including;
a microcontroller configured to receive the first voltage and output a bias signal and a target gap value of the gap amount;
a gap detector configured to detect the gap amount and to output a detected gap amount;
a bias driver configured to receive a second voltage and the bias signal, the bias driver being configured to supply the bias voltage to the first electrostatic actuator in response to the bias signal from the microcontroller so as to drive the first electrostatic actuator; and
a feedback controller configured to receive the third voltage and the target gap value, the feedback controller being configured to supply a feedback voltage to the second electrostatic actuator in response to the target gap value from the microcontroller and the detected gap amount from the gap detector so as to drive the second electrostatic actuator; and
a module controller that controls the optical module,
wherein, when the microcontroller detects that one of the first, second, and third voltages is less than a predetermined threshold, the microcontroller is configured to change each of the bias voltage and the feedback voltage to a value equal to or less than a predetermined value.

8. The electronic apparatus according to claim 7, wherein, when the microcontroller detects that one of the first, second, and third voltages is less than the predetermined threshold, the microcontroller is configured to change each of the bias voltage and the feedback voltage to 0 volt.

9. The electronic apparatus according to claim 7, wherein, when the microcontroller detects that one of the first, second, and third voltages is less than the predetermined threshold, the microcontroller is configured to decrease each of the bias voltage and the feedback voltage.

10. The electronic apparatus according to claim 7, wherein, when the microcontroller detects that one of the first, second, and third voltages is less than the predetermined threshold, the microcontroller is configured to decrease the bias voltage after the microcontroller decreases the feedback voltage.

11. The electronic apparatus according to claim 7, wherein the feedback controller is configured to perform feedback control in which the feedback controller makes the detected gap amount from the gap detector closer to the target gap value from the microcontroller,
the feedback controller is configured to change a driving parameter in the feedback control, and
when the microcontroller decreases the feedback voltage, the feedback controller changes the driving parameter.

12. The electronic apparatus according to claim 7, wherein the voltage controller includes a voltage monitor that outputs a detection signal to the feedback controller when the voltage monitor determines that one of the first, second, and third voltages is less than the predetermined threshold,
the feedback controller includes an output unit and a switch circuit, the output unit outputs the feedback voltage, and the switch circuit is installed on an output side of the output unit and switches between a connected state in which the output unit and the second electrostatic actuator are connected and a non-connected state in which the output unit and the second electrostatic actuator are disconnected, and
the switch circuit switches from the connected state to the non-connected state when the detection signal is input.

* * * * *